(12) United States Patent
Park et al.

(10) Patent No.: US 11,799,695 B2
(45) Date of Patent: *Oct. 24, 2023

(54) METHOD AND APPARATUS FOR UPLINK TRANSMISSION AND RECEPTION IN A WIRELESS COMMUNICATION SYSTEM

(71) Applicant: LG Electronics Inc., Seoul (KR)

(72) Inventors: Jonghyun Park, Seoul (KR); Jiwon Kang, Seoul (KR); Kijun Kim, Seoul (KR); Hanbyul Seo, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/685,125

(22) Filed: Mar. 2, 2022

(65) Prior Publication Data

US 2022/0191065 A1 Jun. 16, 2022

Related U.S. Application Data

(63) Continuation of application No. 16/879,992, filed on May 21, 2020, now Pat. No. 11,336,488, which is a
(Continued)

(51) Int. Cl.
*H04L 25/02* (2006.01)
*H04W 52/14* (2009.01)
(Continued)

(52) U.S. Cl.
CPC ....... *H04L 25/0226* (2013.01); *H04B 7/0486* (2013.01); *H04B 7/0626* (2013.01);
(Continued)

(58) Field of Classification Search
CPC . H04L 25/0226; H04B 7/0486; H04W 52/146
See application file for complete search history.

(56) References Cited

U.S. PATENT DOCUMENTS 10,708,088 B2 7/2020 Park et al.
11,336,488 B2 * 5/2022 Park .................... H04L 5/0051
(Continued)

FOREIGN PATENT DOCUMENTS

CN 102934506 2/2013
CN 104518845 4/2015
(Continued)

OTHER PUBLICATIONS

Extended European Search Report in European Appln. No. 18793772. 7, dated Jan. 30, 2020, 10 pages.
(Continued)

*Primary Examiner* — Mohammad S Anwar
(74) *Attorney, Agent, or Firm* — Fish & Richardson P.C.

(57) ABSTRACT

Disclosed are a method for transmitting and receiving an uplink in a wireless communication system and an apparatus therefore. Specifically, a method for uplink transmission by a User Equipment (UE) in a wireless communication system may include: receiving, from a base station, Sounding Reference Signal (SRS) configuration information, wherein the SRS configuration information includes a parameter set for power control of SRS for each SRS resource set and the SRS resource set includes one or more SRS resources; determining a transmission power of the SRS, based on the parameter set for power control of the SRS; and transmitting the SRS to the base station.

18 Claims, 11 Drawing Sheets

Related U.S. Application Data continuation of application No. 16/064,336, filed as application No. PCT/KR2018/005225 on May 4, 2018, now Pat. No. 10,708,088.

(60) Provisional application No. 62/597,863, filed on Dec. 12, 2017, provisional application No. 62/543,976, filed on Aug. 11, 2017, provisional application No. 62/520,543, filed on Jun. 15, 2017, provisional application No. 62/501,706, filed on May 4, 2017.

(51) Int. Cl.

| | | |
|---|---|---|
| *H04W 80/02* | (2009.01) | |
| *H04B 7/06* | (2006.01) | |
| *H04W 72/044* | (2023.01) | |
| *H04B 7/0456* | (2017.01) | |
| *H04L 5/00* | (2006.01) | |
| *H04W 52/32* | (2009.01) | |
| *H04W 72/04* | (2023.01) | |
| *H04W 72/12* | (2023.01) | |
| *H04W 52/24* | (2009.01) | |
| *H04W 72/23* | (2023.01) | |

(52) U.S. Cl.
CPC .......... *H04B 7/0639* (2013.01); *H04L 5/005* (2013.01); *H04L 5/0048* (2013.01); *H04W 52/14* (2013.01); *H04W 52/146* (2013.01); *H04W 52/24* (2013.01); *H04W 52/32* (2013.01); *H04W 72/04* (2013.01); *H04W 72/046* (2013.01); *H04W 72/0473* (2013.01); *H04W 72/12* (2013.01); *H04W 72/23* (2023.01); *H04W 80/02* (2013.01)

(56) References Cited

U.S. PATENT DOCUMENTS

| | | |
|---|---|---|
| 2011/0098054 A1 | 4/2011 | Gorokhov et al. |
| 2012/0064938 A1 | 3/2012 | Goto et al. |
| 2012/0252474 A1 | 10/2012 | Tiirola et al. |
| 2013/0083729 A1 | 4/2013 | Xu et al. |
| 2014/0016576 A1 | 1/2014 | Noh |
| 2014/0226551 A1 | 8/2014 | Ouchi et al. |
| 2014/0321406 A1 | 10/2014 | Marinier et al. |
| 2015/0085787 A1 | 3/2015 | Ouchi |
| 2015/0124673 A1 | 5/2015 | Ouchi et al. |
| 2015/0223180 A1 | 8/2015 | Noh |
| 2015/0358920 A1 | 12/2015 | Sorrentino et al. |
| 2016/0083729 A1 | 3/2016 | Brown et al. |
| 2016/0219534 A1 | 7/2016 | Hao et al. |
| 2016/0295526 A1 | 10/2016 | Park et al. |
| 2017/0141901 A1 | 5/2017 | Rico Alvarino et al. |
| 2018/0041857 A1 | 2/2018 | Ouchi et al. |
| 2018/0192384 A1 | 7/2018 | Chou et al. |
| 2019/0132103 A1 | 5/2019 | Yang et al. |

FOREIGN PATENT DOCUMENTS

| | | |
|---|---|---|
| CN | 104937860 | 9/2015 |
| EP | 3038281 | 6/2016 |
| JP | 2013-077926 | 4/2013 |
| JP | 2013-527728 | 6/2013 |
| JP | 2014-197871 | 10/2014 |
| JP | 2013-520091 | 5/2015 |
| JP | 2016-021784 | 2/2016 |
| JP | 2016-535471 | 11/2016 |
| KR | 10-2011-0134262 | 12/2011 |
| KR | 10-2012-0121299 | 11/2012 |
| KR | 10-2016-0045060 | 4/2016 |
| RU | 2009134178 | 3/2011 |
| WO | WO 2016/121537 | 8/2016 |

OTHER PUBLICATIONS

InterDigital Communications, "Beam management of multiple beam pairs in uplink," R2-1702883, 3GPP TSG-RAN WG2 #97bis, Spokane Washington, dated Apr. 3-7, 2017, 3 pages.
Notice of Allowance in Japanese Appln. No. 2019-571196, dated Sep. 28, 2021, 8 pages (with English translation).
Notice of Allowance in Korean Appln. No. 10-2019-7000525, dated Jan. 25, 2021, 6 pages (with English translation).
Notice of Allowance in U.S. Appl. No. 16/291,983, dated May 29, 2019, 8 pages.
Office Action in Chinese Appln. No. 201880037090.8, dated Dec. 1, 2021, 15 pages (with English translations).
Office Action in European Appln. No. 18793772.7, dated Sep. 11, 2020, 7 pages.
Office Action in Japanese Appln. No. 2019-571196, dated Dec. 8, 2020, 9 pages (with English translation).
Office Action in Korean Appln. No. 10-2021-7012524, dated Jan. 26, 2022, 9 pages (with English translation).
Office Action in Russian Appln. No. 2019139249, dated Aug. 2, 2021, 16 pages (with English translation).
Office Action in U.S. Appl. No. 16/064,336, dated Sep. 23, 2019, 14 pages.
Huawei & HiSilicon, "UL SRS design for CSI acquisition and beam management," R1-1704241, 3GPP TSG RAN WG1 Meeting #88bis, Spokane, USA Apr. 3-7, 2017, 16 pages.
Notice of Allowance in Korean Appln. No. 10-2021-7012524, dated Jul. 28, 2022, 8 pages (with English translation).
Office Action in Japanese Appln. No. 2021-173764, dated Jan. 31, 2023, 8 pages (with English translation).

\* cited by examiner

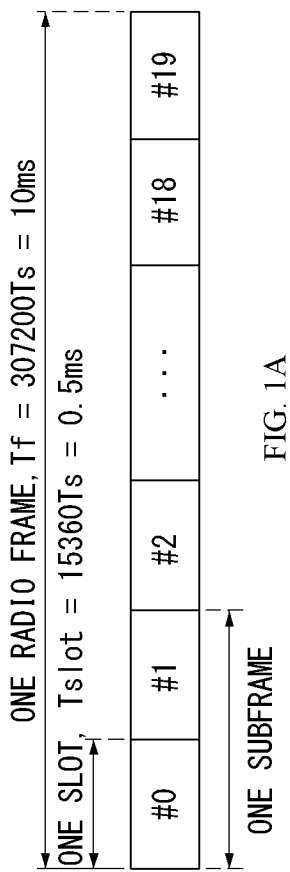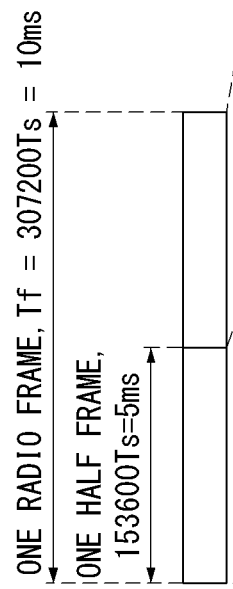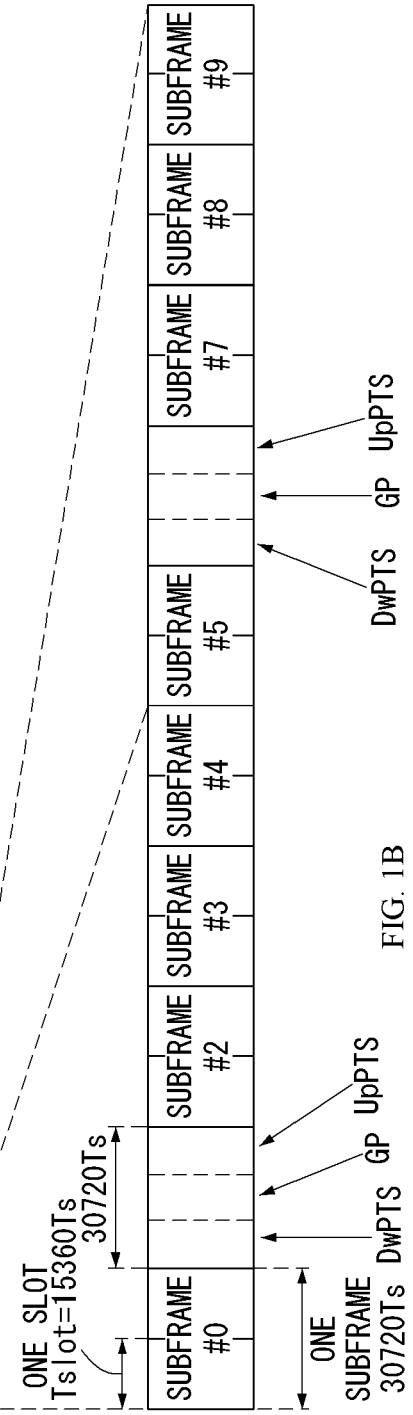
FIG. 1A
FIG. 1B

METHOD AND APPARATUS FOR UPLINK TRANSMISSION AND RECEPTION IN A WIRELESS COMMUNICATION SYSTEM

CROSS-REFERENCE TO RELATED APPLICATIONS

This application is a continuation of U.S. application Ser. No. 16/879,992, filed on May 21, 2020, which is a continuation application of U.S. application Ser. No. 16/064,336, filed on Jan. 9, 2019, now U.S. Pat. No. 10,708,088, which is a National Stage application under 35 U.S.C. § 371 of International Application No. PCT/KR2018/005225, filed on May 4, 2018, which claims the benefit of U.S. Provisional Application No. 62/597,863, filed on Dec. 12, 2017, U.S. Provisional Application No. 62/543,976, filed on Aug. 11, 2017, U.S. Provisional Application No. 62/520,543, filed on Jun. 15, 2017, and U.S. Provisional Application No. 62/501,706, filed on May 4, 2017. The disclosures of the prior applications are incorporated by reference in their entirety.

TECHNICAL FIELD

The present invention relates to a wireless communication system, and more particularly, to a method for uplink transmission/reception and transmission power control and an apparatus for supporting the same.

BACKGROUND

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

SUMMARY

An object of the present invention is to propose a method for transmitting/receiving an uplink signal (e.g., SRS)/channel (e.g., physical uplink control channel (PUCCH) and physical uplink shared channel (PUSCH), in particular, a transmission power control of an uplink signal/channel.

Further, an object of the present invention is to propose an uplink power control method for multiple sounding reference signals (SRS).

The technical objects of the present invention are not limited to the aforementioned technical objects, and other technical objects, which are not mentioned above, will be apparently appreciated by a person having ordinary skill in the art from the following description.

In an aspect of the present invention, a method for uplink transmission by a User Equipment (UE) in a wireless communication system may include: receiving, from a base station, Sounding Reference Signal (SRS) configuration information, wherein the SRS configuration information includes a parameter set for power control of SRS for each SRS resource set and the SRS resource set includes one or more SRS resources; determining a transmission power of the SRS, based on the parameter set for power control of the SRS; and transmitting the SRS to the base station.

In another aspect of the present invention, a user equipment (UE) performing uplink transmission in a wireless communication system may include: a transceiver for transmitting and receiving a radio signal; and a processor for controlling the transceiver, in which the processor may be configured to receive, from a base station, Sounding Reference Signal (SRS) configuration information, wherein the SRS configuration information includes a parameter set for power control of SRS for each SRS resource set and the SRS resource set includes one or more SRS resources; determine a transmission power of the SRS, based on the parameter set for power control of the SRS; and transmit the SRS to the base station.

Preferably, the transmission power of the SRS may be determined, based on a downlink path-loss estimation value calculated by the UE using a downlink reference signal indicated by the parameter set for the power control of the SRS.

Preferably, the downlink reference signal may include Synchronization Signal Block (SSB) and Channel State Information-Reference Signal (CSI-RS).

Preferably, the downlink reference signal is changed by a Medium Access Control-Control Element (MAC-CE) transmitted by the base station.

Preferably, the transmission power of the SRS may be determined by applying a Transmit Power Control (TPC) accumulation commonly to the SRS resource set.

Preferably, a power control adjustment for adjusting the transmission power of the SRS may be applied independently for each specific SRS transmission interval.

Preferably, when the power control adjustment is triggered, all of transmission power values of the SRS may be identically adjusted on all SRS resources, regardless of the transmission power of the SRS being determined.

Preferably, when the adjusted transmission power value exceeds a predetermined value, the adjusted transmission power value may be scaled down collectively.

Preferably, the method may further include: receiving, from the base station, downlink control information (DCI) including Physical Uplink Shared Channel (PUSCH) scheduling information, wherein the DCI includes a SRS Resource Indicator (SRI); determining a PUSCH transmission power based on a parameter set for power control of PUSCH determined from the SRI; and transmitting the PUSCH to the base station.

Preferably, when a plurality of SRS resources are indicated by the SRI and a layer group is configured differently for each of the plurality of SRS resources, a parameter set for power control of the PUSCH may be respectively determined for each layer group.

Preferably, the transmission power of the PUSCH may be determined, based on a downlink path-loss estimation value calculated by the UE using a downlink reference signal indicated by the parameter set for the power control of the PUSCH.

Preferably, the downlink reference signal may be changed by a Medium Access Control-Control Element (MAC-CE) transmitted by the base station.

Preferably, the method may further include: determining a transmission power of Physical Uplink Shared Channel (PUSCH) based on a downlink path-loss estimation value calculated by the UE using a downlink reference signal; and transmitting the PUSCH to the base station, in which when information for the downlink reference signal is not provided by the base station, the path-loss estimation value may be calculated using a downlink reference signal having a relatively largest power level.

According to an embodiment of the present invention, a transmission power can be efficiently controlled when an uplink signal/channel is transmitted.

Furthermore, according to an embodiment of the present invention, the transmission power can be efficiently controlled when the uplink signal/channel is transmitted in a situation in which a plurality of SRS resources is configured.

Advantages which can be obtained in the present invention are not limited to the aforementioned effects and other unmentioned advantages will be clearly understood by those skilled in the art from the following description.

BRIEF DESCRIPTION OF DRAWINGS

The accompanying drawings, which are included herein as a part of the description for help understanding the present invention, provide embodiments of the present invention, and describe the technical features of the present invention with the description below.

FIGS. 1A and 1B illustrate the structure of a radio frame in a wireless communication system to which the present invention may be applied.

DETAILED DESCRIPTION

Figure 2:
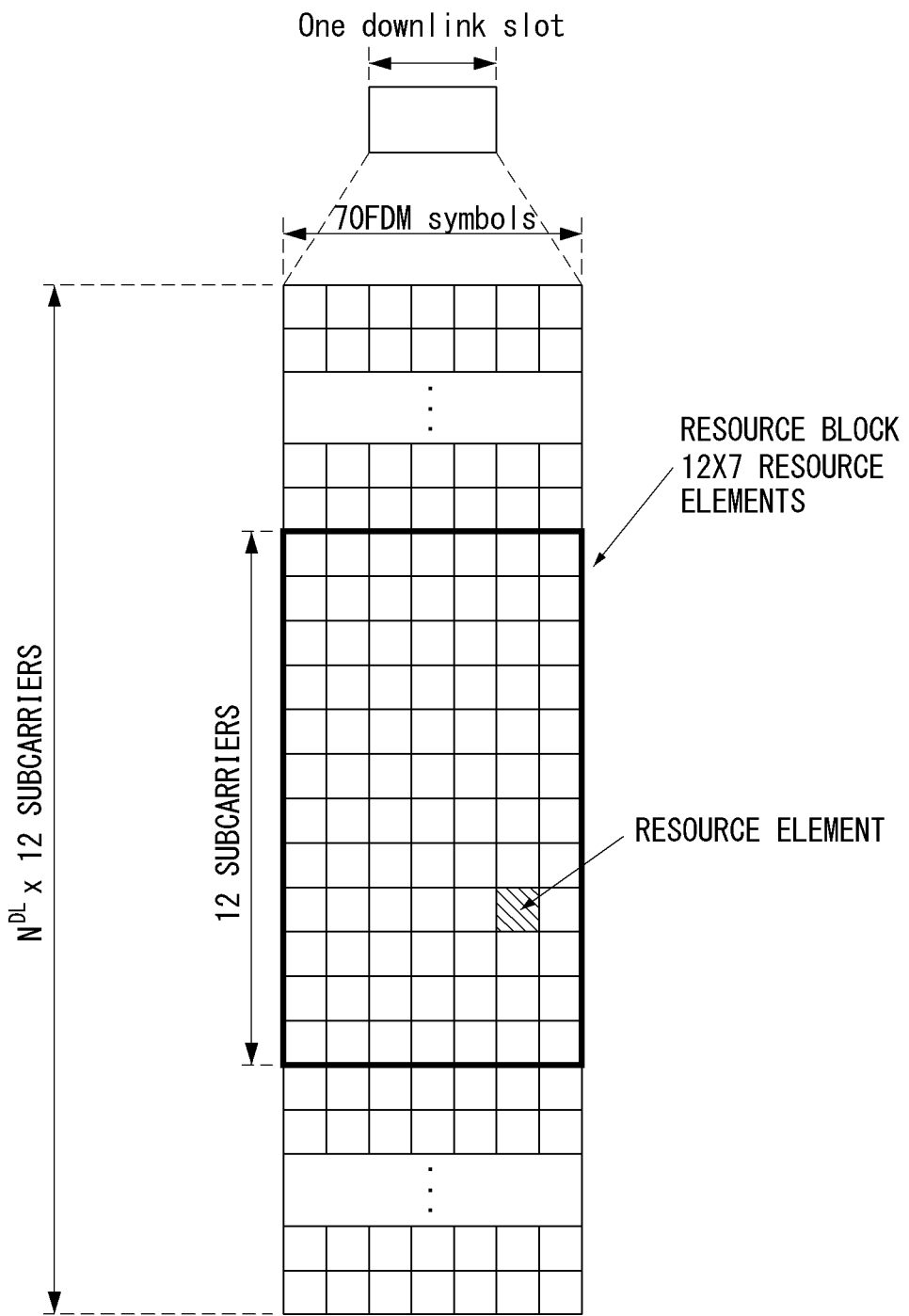
FIG. 2 is a diagram illustrating a resource grid for a downlink slot in a wireless communication system to which the present invention may be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A or new RAT (RAT in 5G (5 generation) system) is chiefly described, but the technical characteristics of the present invention are not limited thereto.

General System to which the Present Invention May be Applied

FIGS. 1A and 1B show the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1A exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1B shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, CD' represents a subframe for a DL transmission, '1.1' represents a subframe for UL transmission, and CS' represents a special subframe including three types of fields including a Downlink Pilot Time Slot (DwPTS), a Guard Period (GP), and an uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIGS. 1A and 1B is just an example, and the number of subcarriers included in a radio frame, the number of slots included in a subframe and the number of OFDM symbols included in a slot may be changed in various manners.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

Figure 3:
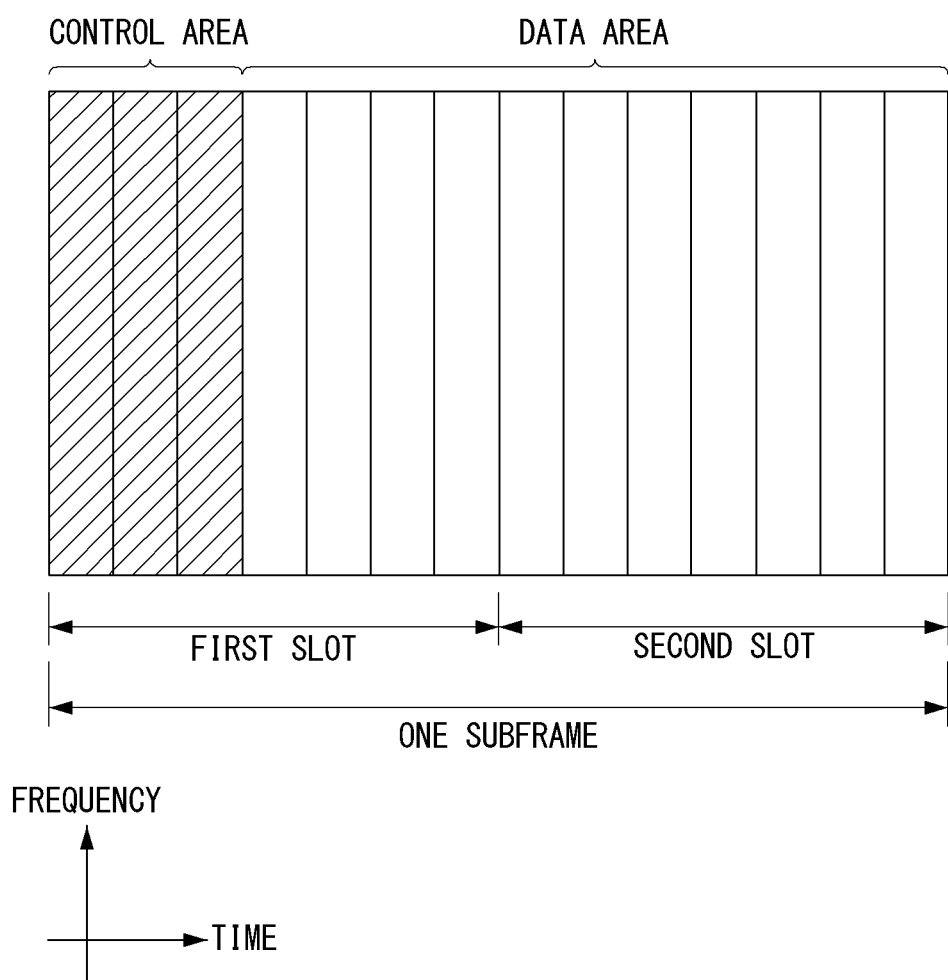
FIG. 3 illustrates a structure of downlink subframe in a wireless communication system to which the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

Figure 4:
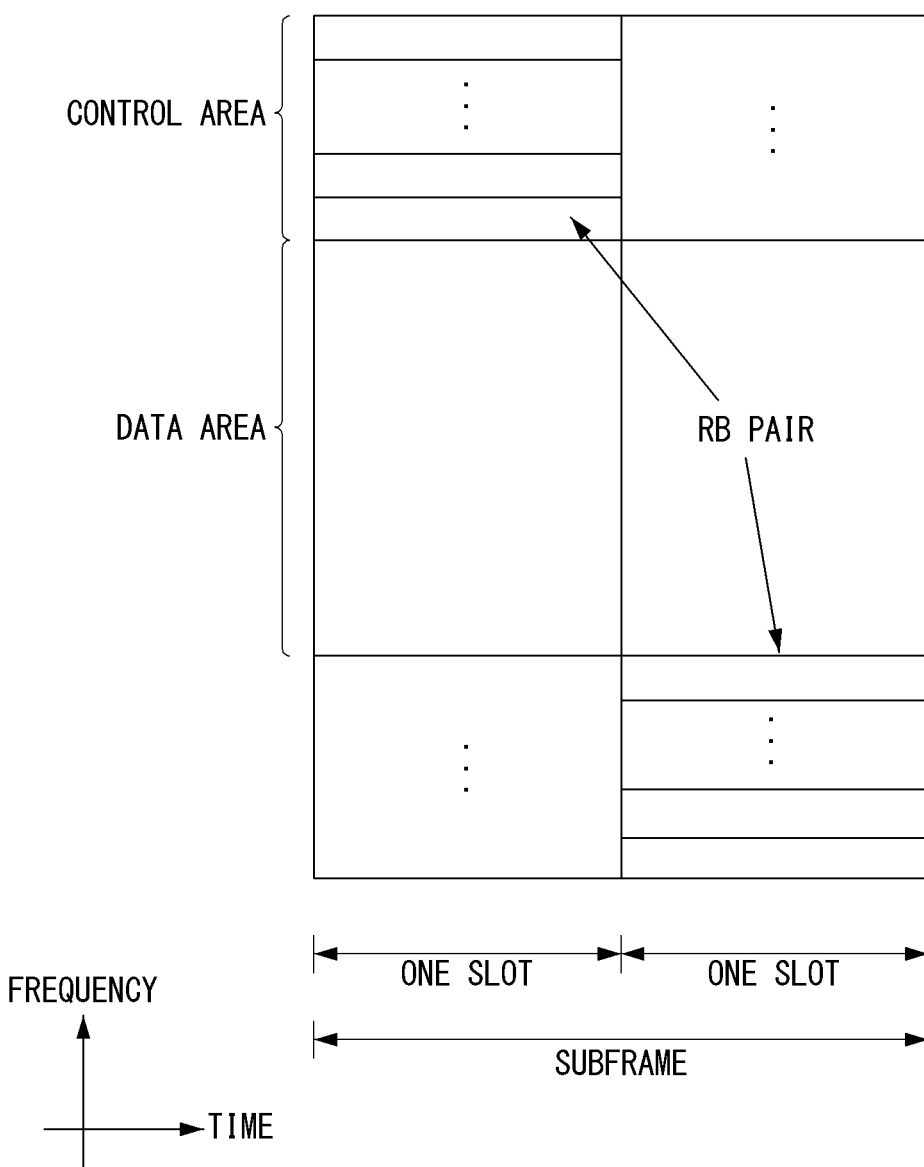
FIG. 4 illustrates a structure of uplink subframe in a wireless communication system to which the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
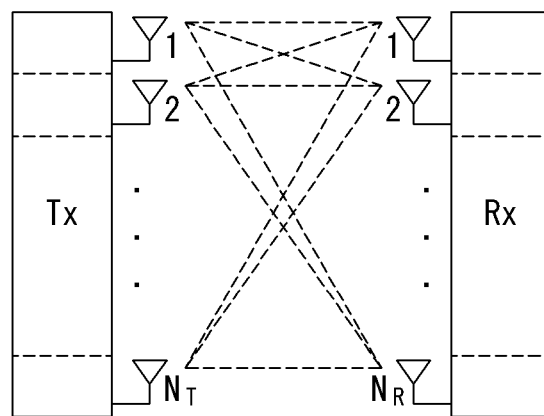
FIG. 5 illustrates the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \quad \text{Equation 1}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}]^T \quad \text{Equation 2}$$

Meanwhile, transmission power may be different in each of pieces of transmission information s_1, s_2, ..., s_NT. In this case, if pieces of transmission power are P_1, P_2, ..., P_NT, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{Equation 3}$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{Equation 4}$$

Meanwhile, the information vector having controlled transmission power in the Equation 4 is multiplied by a weight matrix W, thus forming N_T transmission signals x_1, x_2, ..., x_NT that are actually transmitted. In this case, the weight matrix functions to properly distribute the transmission information to antennas according to a transport channel condition. The following may be represented using the transmission signals x_1, x_2, ..., x_NT.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{Equation 5}$$

In this case, w_ij denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, ..., y_NR of the respective antennas are represented as follows using a vector y.

$$y = [y_1, y_2, \ldots, y_{N_R}]^T \qquad \text{Equation 6}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
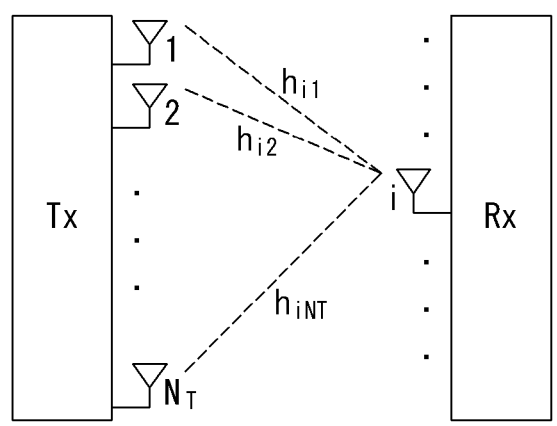
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}] \qquad \text{Equation 7}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \qquad \text{Equation 8}$$

Meanwhile, Additive White Gaussian Noise (AWGN) is added to an actual channel after the actual channel experiences the channel matrix H. Accordingly, AWGN n_1, n_2, ..., n_NR added to the N_R reception antennas, respectively, are represented using a vector as follows.

$$n = [n_1, n_2, \ldots, n_{N_R}]^T \qquad \text{Equation 9}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{Equation 10}$$

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \qquad \text{Equation 11}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

Figure 7A:
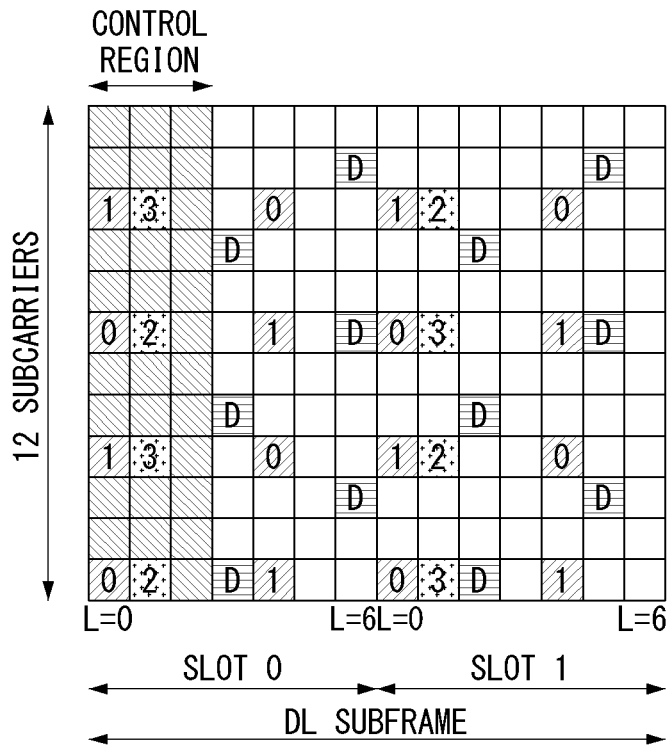
FIGS. 7A and 7B illustrate reference signal patterns mapped to downlink resource block pairs in a wireless communication system to which the present invention may be applied.
Figure 7B:
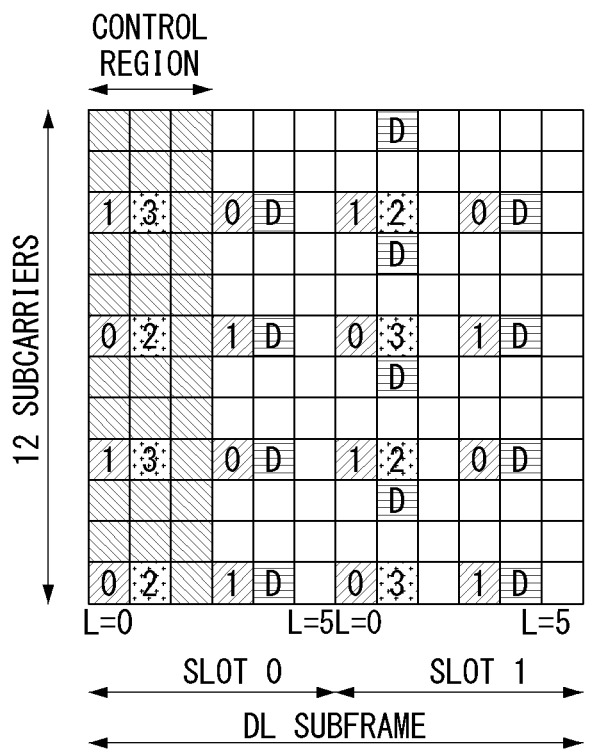

FIGS. 7A and 7B illustrate reference signal patterns mapped to downlink resource block pairs in a wireless communication system to which the present invention may be applied.

Referring to FIGS. 7A and 7B, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 7A) and has a length of 12 OFDM symbols in the case of an extended cyclic prefix (CP) (FIG. 7B). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CSI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, if the number of transmission antennas of an eNB is two, CRSs for a No. 0 antenna port and a No. 1 antenna port are transmitted. If the number of transmission antennas of an eNB is four, CRSs for No. 0 No. 3 antenna ports are transmitted. If the number of transmission antennas of an eNB is four, a CRS pattern in one RB is shown in FIGS. 7A and 7B.

If an eNB uses a single transmission antenna, reference signals for a single antenna port are arrayed.

If an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, if an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

If a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

A DRS is described in more detail below. The DRS is used to demodulate data. In multi-input multi-output antenna transmission, precoding weight used for a specific UE is combined with a transmission channel transmitted by each transmission antenna when the UE receives an RS, and is used to estimate a corresponding channel without any change.

A 3GPP LTE system (e.g., Release-8) supports a maximum of four transmission antennas, and a DRS for rank 1 beamforming is defined. The DRS for rank 1 beamforming also indicates an RS for an antenna port index 5.

In an LTE-A system, that is, an advanced and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, if an eNB has four to a maximum of eight downlink transmission antennas in the LTE-A system, RSs for these antenna ports must be additionally defined and designed. Regarding the RSs for the maximum of eight transmission antenna ports, the aforementioned RS for channel measurement and the aforementioned RS for data demodulation must be designed.

One of important factors that must be considered in designing an LTE-A system is backward compatibility, that is, that an LTE UE must well operate even in the LTE-A system, which must be supported by the system. From an RS transmission viewpoint, in the time-frequency domain in which a CRS defined in LTE is transmitted in a full band every subframe, RSs for a maximum of eight transmission antenna ports must be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement object for the selection of MCS or a PMI (channel state information-RS or channel state indication-RS (CSI-RS)) and an RS for the demodulation of data transmitted through eight transmission antennas (data demodulation-RS (DM-RS)).

The CSI-RS for the channel measurement object is characterized in that it is designed for an object focused on channel measurement unlike the existing CRS used for objects for measurement, such as channel measurement and handover, and for data demodulation. Furthermore, the CSI-RS may also be used for an object for measurement, such as handover. The CSI-RS does not need to be transmitted every subframe unlike the CRS because it is transmitted for an object of obtaining information about a channel state. In order to reduce overhead of a CSI-RS, the CSI-RS is intermittently transmitted on the time axis.

For data demodulation, a DM-RS is dedicatedly transmitted to a UE scheduled in a corresponding time-frequency domain. That is, a DM-RS for a specific UE is transmitted only in a region in which the corresponding UE has been scheduled, that is, in the time-frequency domain in which data is received.

In the LTE-A system, a maximum of eight transmission antennas are supported in the downlink of an eNB. In the LTE-A system, if RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement object for the selection of MCS or a PMI and the DM-RS for data demodulation, and thus the two RSs have been added. The CSI-RS may also be used for an object, such as RRM measurement, but has been designed for a main object for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

For data demodulation, a DM-RS is dedicatedly transmitted to a UE scheduled in a corresponding time-frequency domain. That is, a DM-RS for a specific UE is transmitted only in the region in which scheduling is performed for the corresponding UE, that is, only in the time-frequency domain in which data is received.

In order to measure a CSI-RS, a UE must be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB must notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, . . . , 18, and p=15, . . . , 22, respectively. A CSI-RS may be defined for only a subcarrier interval $\Delta f=15$ kHz.

In a subframe configured for CSI-RS transmission, a CSI-RS sequence is mapped to a complex-valued modulation symbol $a\_k,l^{\wedge}(p)$ used as a reference symbol on each antenna port p as in Equation 12.

$$a_{k,l}^{(p)} = w_{l''} \cdot r_{l,n_s}(m') \qquad \text{Equation 12}$$

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 12, (k',l') (wherein k' is a subcarrier index within a resource block and l' indicates an OFDM symbol index within a slot.) and the condition of n_s is determined depending on a CSI-RS configuration, such as Table 3 or Table 4.

Table 3 illustrates the mapping of (k',l') from a CSI-RS configuration in a normal CP.

TABLE 3

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| Frame structure type 2 only | | | | | | |
| 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |

TABLE 3-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

Table 4 illustrates the mapping of (k',l') from a CSI-RS configuration in an extended CP.

TABLE 4

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |

TABLE 4-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 2 only | | | | | | |
| 16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | | reduce inter-cell interference (ICI) in a multi-cell environment including a heterogeneous network (HetNet) environment, a maximum of 32 different configurations (in the case of a normal CP) or a maximum of 28 different configurations (in the case of an extended CP) are defined.

The CSI-RS configuration is different depending on the number of antenna ports and a CP within a cell, and a neighboring cell may have a maximum of different configurations. Furthermore, the CSI-RS configuration may be divided into a case where it is applied to both an FDD frame and a TDD frame and a case where it is applied to only a TDD frame depending on a frame structure.

(k',l') and n_s are determined depending on a CSI-RS configuration based on Table 3 and Table 4, and time-frequency resources used for CSI-RS transmission are determined depending on each CSI-RS antenna port.

Figure 8A:
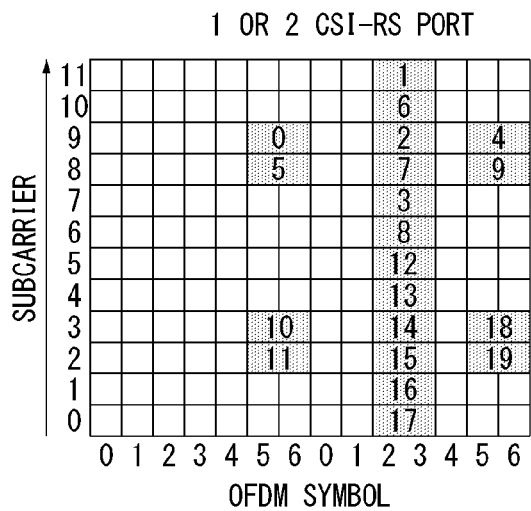
FIGS. 8A through 8C are diagrams illustrating resources to which reference signals are mapped in a wireless communication system to which the present invention may be applied.
Figure 8B:
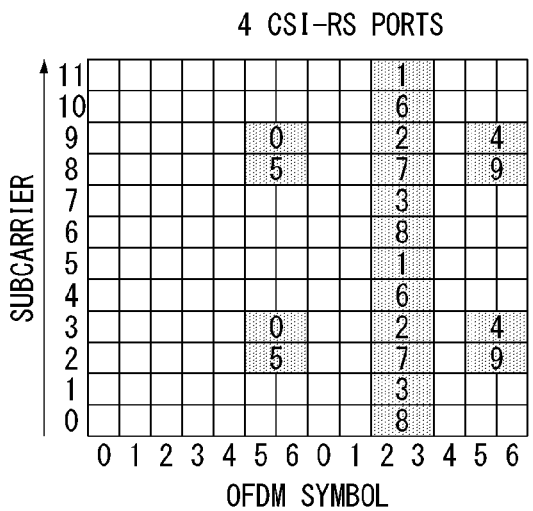
Figure 8C:
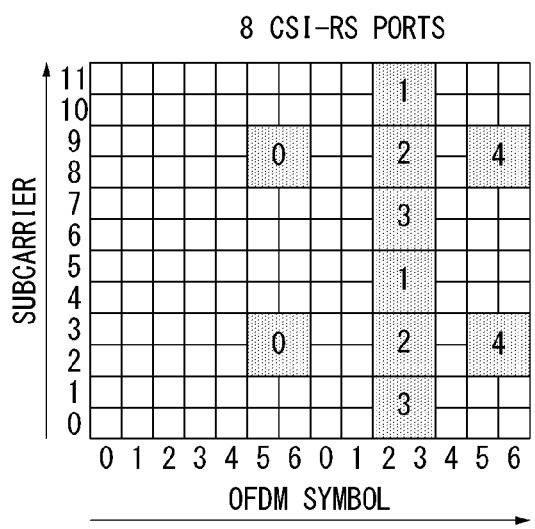

FIGS. 8A through 8C are diagrams illustrating resources to which reference signals are mapped in a wireless communication system to which the present invention may be applied.

FIG. 8A shows twenty types of CSI-RS configurations available for CSI-RS transmission by one or two CSI-RS antenna ports, FIG. 8B shows ten types of CSI-RS configurations available for four CSI-RS antenna ports, and FIG. 8C shows five types of CSI-RS configurations available for eight CSI-RS antenna ports.

As described above, radio resources (i.e., an RE pair) in which a CSI-RS is transmitted are determined depending on each CSI-RS configuration.

If one or two antenna ports are configured for CSI-RS transmission with respect to a specific cell, the CSI-RS is transmitted on radio resources on a configured CSI-RS configuration of the twenty types of CSI-RS configurations shown in FIG. 8A.

Likewise, when four antenna ports are configured for CSI-RS transmission with respect to a specific cell, a CSI-RS is transmitted on radio resources on a configured CSI-RS configuration of the ten types of CSI-RS configurations shown in FIG. 8B. Furthermore, when eight antenna ports are configured for CSI-RS transmission with respect to a specific cell, a CSI-RS is transmitted on radio resources on a configured CSI-RS configuration of the five types of CSI-RS configurations shown in FIG. 8C.

A CSI-RS for each antenna port is subjected to CDM for every two antenna ports (i.e., {15,16}, {17,18}, {19,20} and {21,22}) on the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and mapped to the same radio resources. The complex symbol of the CSI-RS for the antenna port 15 is multiplied by [1, 1], and the complex symbol of the CSI-RS for the antenna port 16 is multiplied by [1 −1] and mapped to the same radio resources. The same is true of the antenna ports {17,18}, {19,20} and {21,22}.

A UE may detect a CSI-RS for a specific antenna port by multiplying code by which a transmitted symbol has been multiplied. That is, a transmitted symbol is multiplied by the code [1 1] multiplied in order to detect the CSI-RS for the antenna port 15, and a transmitted symbol is multiplied by the code [1 −1] multiplied in order to detect the CSI-RS for the antenna port 16.

Referring to FIGS. 8A through 8C, in the case of the same CSI-RS configuration index, radio resources according to a CSI-RS configuration having a large number of antenna ports include radio resources having a small number of CSI-RS antenna ports. For example, in the case of a CSI-RS configuration 0, radio resources for the number of eight antenna ports include both radio resources for the number of four antenna ports and radio resources for the number of one or two antenna ports.

A plurality of CSI-RS configurations may be used in one cell. 0 or one CSI-RS configuration may be used for a non-zero power (NZP) CSI-RS, and 0 or several CSI-RS configurations may be used for a zero power (ZP) CSI-RS.

For each bit set to 1 in a zeropower (ZP) CSI-RS ('ZeroPowerCSI-RS') that is a bitmap of 16 bits configured by a high layer, a UE assumes zero transmission power in REs (except a case where an RE overlaps an RE assuming a NZP CSI-RS configured by a high layer) corresponding to the four CSI-RS columns of Table 3 and Table 4. The most significant bit (MSB) corresponds to the lowest CSI-RS configuration index, and next bits in the bitmap sequentially correspond to next CSI-RS configuration indices.

A CSI-RS is transmitted only in a downlink slot that satisfies the condition of (n_s mod 2) in Table 3 and Table 4 and a subframe that satisfies the CSI-RS subframe configurations.

In the case of the frame structure type 2 (TDD), a CSI-RS is not transmitted in a special subframe, a synchronization signal (SS), a subframe colliding against a PBCH or SystemInformationBlockType1 (SIB 1) Message transmission or a subframe configured to paging message transmission.

Furthermore, an RE in which a CSI-RS for any antenna port belonging to an antenna port set S (S={15}, S={15,16}, S={17,18}, S={19,20} or S={21,22}) is transmitted is not used for the transmission of a PDSCH or for the CSI-RS transmission of another antenna port.

Time-frequency resources used for CSI-RS transmission cannot be used for data transmission. Accordingly, data throughput is reduced as CSI-RS overhead is increased. By considering this, a CSI-RS is not configured to be transmitted every subframe, but is configured to be transmitted in each transmission period corresponding to a plurality of subframes. In this case, CSI-RS transmission overhead can be significantly reduced compared to a case where a CSI-RS is transmitted every subframe.

A subframe period (hereinafter referred to as a "CSI transmission period") T_CSI-RS and a subframe offset Δ_CSI-RS for CSI-RS transmission are shown in Table 5.

Table 5 Illustrates CSI-RS Subframe Configurations

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

Referring to Table 5, the CSI-RS transmission period T_CSI-RS and the subframe offset Δ_CSI-RS are determined depending on the CSI-RS subframe configuration I_CSI-RS.

The CSI-RS subframe configuration of Table 5 may be configured as one of the aforementioned 'SubframeConfig' field and 'zeroTxPowerSubframeConfig' field. The CSI-RS subframe configuration may be separately configured with respect to an NZP CSI-RS and a ZP CSI-RS.

A subframe including a CSI-RS satisfies Equation 13.

$$(10 n_f + \lfloor n_s/2 \rfloor - \Delta_{CSI-RS}) \bmod T_{CSI-RS} = 0 \qquad \text{Equation 13}$$

In Equation 13, T_CSI-RS means a CSI-RS transmission period, Δ_CSI-RS means a subframe offset value, n_f means a system frame number, and n_s means a slot number.

In the case of a UE in which the transmission mode 9 has been configured with respect to a serving cell, one CSI-RS resource configuration may be configured for the UE. In the case of a UE in which the transmission mode 10 has been configured with respect to a serving cell, one or more CSI-RS resource configuration (s) may be configured for the UE.

In the current LTE standard, a CSI-RS configuration includes an antenna port number (antennaPortsCount), a subframe configuration (subframeConfig), and a resource configuration (resourceConfig). Accordingly, the a CSI-RS configuration provides notification that a CSI-RS is transmitted how many antenna port, provides notification of the period and offset of a subframe in which a CSI-RS will be transmitted, and provides notification that a CSI-RS is transmitted in which RE location (i.e., a frequency and OFDM symbol index) in a corresponding subframe.

Specifically, the following parameters for each CSI-RS (resource) configuration are configured through high layer signaling.

If the transmission mode 10 has been configured, a CSI-RS resource configuration identifier A CSI-RS port number (antennaPortsCount): a parameter (e.g., one CSI-RS port, two CSI-RS ports, four CSI-RS ports or eight CSI-RS ports) indicative of the number of antenna ports used for CSI-RS transmission A CSI-RS configuration (resourceConfig) (refer to Table 3 and Table 4): a parameter regarding a CSI-RS allocation resource location A CSI-RS subframe configuration (subframeConfig, that is, I_CSI-RS) (refer to Table 5): a parameter regarding the period and/or offset of a subframe in which a CSI-RS will be transmitted If the transmission mode 9 has been configured, transmission power P_C for CSI feedback: in relation to the assumption of a UE for reference PDSCH transmission power for feedback, when the UE derives CSI feedback and takes a value within a [−8, 15] dB range in a 1-dB step size, P_C is assumed to be the ratio of energy per resource element (EPRE) per PDSCH RE and a CSI-RS EPRE.

If the transmission mode 10 has been configured, transmission power P_C for CSI feedback with respect to each CSI process. If CSI subframe sets C_CSI,0 and C_CSI,1 are configured by a high layer with respect to a CSI process, P_C is configured for each CSI subframe set in the CSI process.

A pseudo-random sequence generator parameter n_ID

If the transmission mode 10 has been configured, a high layer parameter 'qcl-CRS-Info-r11' including a QCL scrambling identifier for a quasico-located (QCL) type B UE assumption (qcl-ScramblingIdentity-r11), a CRS port count (crs-PortsCount-r11), and an MBSFN subframe configuration list (mbsfn-SubframeConfigList-r11) parameter.

When a CSI feedback value derived by a UE has a value within the [−8, 15] dB range, P_C is assumed to be the ration of PDSCH EPRE to CSI-RS EPRE. In this case, the PDSCH EPRE corresponds to a symbol in which the ratio of PDSCH EPRE to CRS EPRE is p_A.

A CSI-RS and a PMCH are not configured in the same subframe of a serving cell at the same time.

In the frame structure type 2, if four CRS antenna ports have been configured, a CSI-RS configuration index belonging to the [20-31] set (refer to Table 3) in the case of a normal CP or a CSI-RS configuration index belonging to the [16-27] set (refer to Table 4) in the case of an extended CP is not configured in a UE.

A UE may assume that the CSI-RS antenna port of a CSI-RS resource configuration has a QCL relation with delay spread, Doppler spread, Doppler shift, an average gain and average delay.

A UE in which the transmission mode 10 and the QCL type B have been configured may assume that antenna ports 0-3 corresponding to a CSI-RS resource configuration and antenna ports 15-22 corresponding to a CSI-RS resource configuration have QCL relation with Doppler spread and Doppler shift.

In the case of a UE in which the transmission modes 1-9 have been configured, one ZP CSI-RS resource configuration may be configured in the UE with respect to a serving cell. In the case of a UE in which the transmission mode 10 has been configured, one or more ZP CSI-RS resource configurations may be configured in the UE with respect to a serving cell.

The following parameters for a ZP CSI-RS resource configuration may be configured through high layer signaling.

The ZP CSI-RS configuration list (zeroTxPowerResourceConfigList) (refer to Table 3 and Table 4): a parameter regarding a zero-power CSI-RS configuration The ZP CSI-RS subframe configuration (eroTxPowerSubframeConfig, that is, I_CSI-RS) (refer to Table 5): a parameter regarding the period and/or offset of a subframe in which a zero-power CSI-RS is transmitted A ZP CSI-RS and a PMCH are not configured in the same subframe of a serving cell at the same time.

In the case of a UE in which the transmission mode 10 has been configured, one or more channel state information-interference measurement (CSI-IM) resource configurations may be configured in the UE with respect to a serving cell.

The following parameters for each CSI-IM resource configuration may be configured through high layer signaling.

The ZP CSI-RS configuration (refer to Table 3 and Table 4)

The ZP CSI RS subframe configuration I_CSI-RS (refer to Table 5)

A CSI-IM resource configuration is the same as any one of configured ZP CSI-RS resource configurations.

A CSI-IM resource and a PMCH are not configured within the same subframe of a serving cell at the same time.

Sounding Reference Signal (SRS)

An SRS is mainly used for channel quality measurement to perform uplink frequency-selective scheduling and is not related to transmission of uplink data and/or control information. However, the present invention is not limited thereto and the SRS may be used for various other purposes to enhance power control or to support various start-up functions of recently unscheduled terminals. As an example of the start-up function, an initial modulation and coding scheme (MCS), initial power control for data transmission, timing advance, and frequency semi-selective scheduling may be included. In this case, frequency semi-selective scheduling refers to scheduling that selectively allocates frequency resources to a first slot of a subframe and allocating the frequency resources by pseudo-randomly jumping to another frequency in a second slot.

Further, the SRS may be used for measuring a downlink channel quality under the assumption that radio channels are reciprocal between the uplink and the downlink. The assumption is particularly effective in a time division duplex (TDD) system in which the uplink and the downlink share the same frequency spectrum and are separated in a time domain.

The SRS subframes transmitted by a certain UE in a cell may be represented by a cell-specific broadcast signal. A 4 bit cell-specific 'srsSubframeConfiguration' parameter represents 15 available subframe arrays through which the SRS may be transmitted over each radio frame. The arrays provide flexibility for adjustment of SRS overhead according to a deployment scenario.

A 16-th array completely turns off a switch of the SRS in the cell and this is primarily suitable for a serving cell that serves high-speed terminals.

Figure 9:
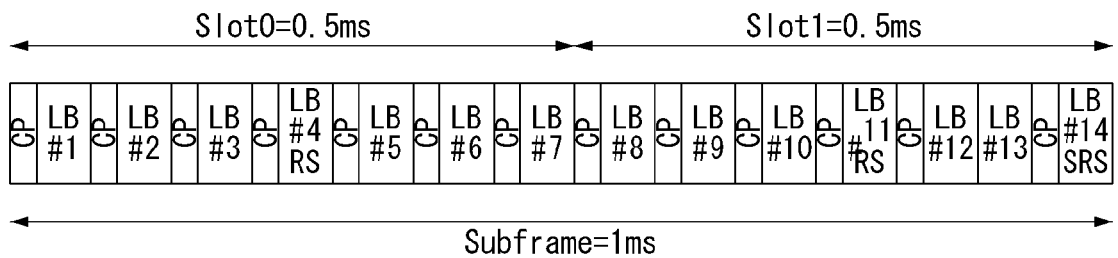
FIG. 9 illustrates an uplink subframe including a sounding reference signal symbol in a wireless communication system to which the present invention may be applied.

FIG. 9 illustrates an uplink subframe including a sounding reference signal symbol in a wireless communication system to which the present invention may be applied.

Referring to FIG. 9, the SRS is continuously transmitted on the last SC-FDMA symbol on the arranged subframe. Therefore, the SRS and the DMRS are located in different SC-FDMA symbols.

PUSCH data transmission is not allowed in a specific SC-FDMA symbol for SRS transmission and as a result, when the sounding overhead is the highest, that is, even if SRS symbols are included in all subframes, the sounding overhead does not exceed approximately 7%.

Each SRS symbol is generated by a basic sequence (random sequence or a sequence set based on Zadoff-Ch (ZC)) for a given time unit and frequency band, and all terminals in the same cell use the same basic sequence. In this case, the SRS transmissions from a plurality of UEs in the same cell at the same time in the same frequency band are orthogonal by different cyclic shifts of the basic sequence, and are distinguished from each other.

By assigning different basic sequences to respective cells, the SRS sequences from different cells may be distinguished, but orthogonality between different basic sequences is not guaranteed.

As more and more communication devices require larger communication capacity, there is a need for improved mobile broadband communication compared to the existing radio access technology (RAT). Massive machine type communications (MTCs), which provide various services anytime and anywhere by connecting many devices and objects, are one of the major issues to be considered in the next generation communication. In addition, a communication system design considering a service/UE sensitive to reliability and latency is being discussed.

The introduction of next generation radio access technology considering enhanced mobile broadband communication, massive MTC, ultra-reliable and low latency communication (URLLC) is discussed, and in the present invention, the technology is called new RAT for convenience.

Self-Contained Subframe Structure

Figure 10:
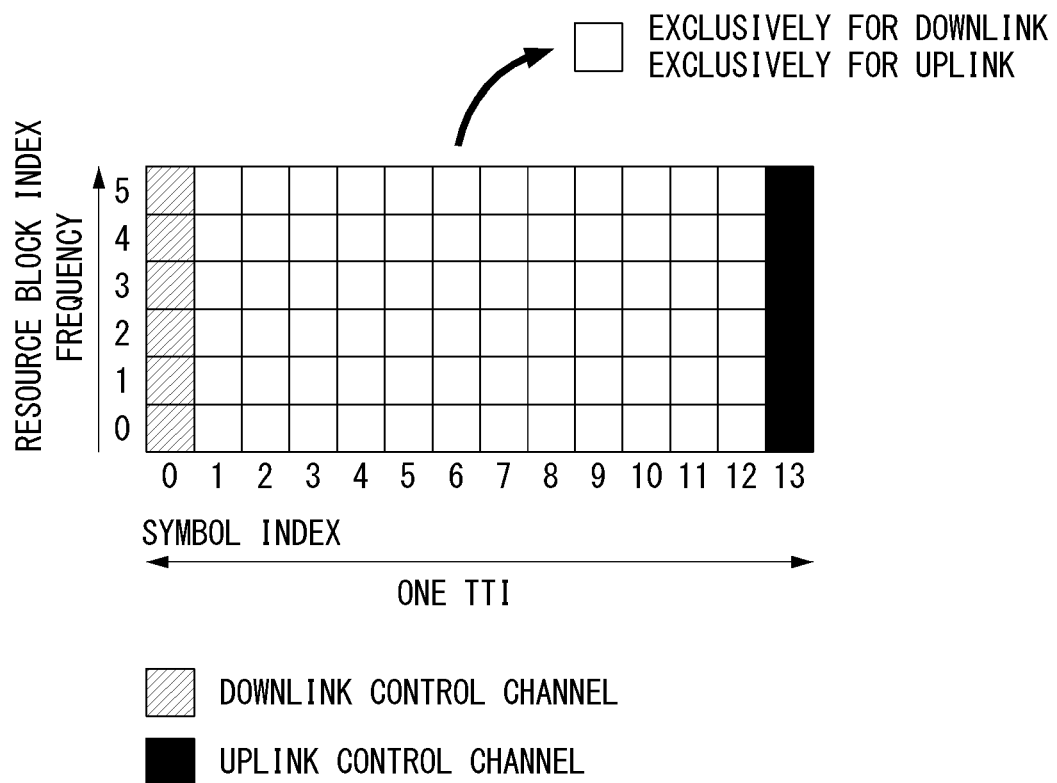
FIG. 10 is a diagram illustrating a self-contained subframe structure in the wireless communication system to which the present invention may be applied.

FIG. 10 is a diagram illustrating a self-contained subframe structure in the wireless communication system to which the present invention may be applied.

In a TDD system, in order to minimize the latency of data transmission, a 5 generation (5G) new RAT considers a self-contained subframe structure as shown in FIG. 10.

In FIG. 10, a dashed area (symbol index of 0) indicates a downlink (DL) control area and a black area (symbol index of 13) indicates an uplink (UL) control area. An unmarked area may also be used for DL data transmission or for UL data transmission. Such a structure is characterized in that DL transmission and UL transmission are sequentially performed in one subframe, and DL data is transmitted in a subframe, and UL ACK/NACK may also be received. As a result, it takes less time to retransmit data when a data transmission error occurs, thereby minimizing the latency of final data transmission.

In such a self-contained subframe structure, there is a need for a time gap between the base station and the UE for the conversion process from the transmission mode to the reception mode or from the reception mode to the transmission mode. For this end, some OFDM symbols at the time of switching from DL to UL in the self-contained subframe structure are configured to a guard period (GP).

Analog Beamforming

In a millimeter wave (mmW), a wavelength is shortened, so that a plurality of antenna elements may be installed in the same area. That is, a total of 64 (8×8) antenna elements may be installed in a 2-dimension array at a 0.5 lambda (that is, wavelength) interval on a panel of 4×4 (4 by 4) cm with a wavelength of 1 cm in a 30 GHz band. Therefore, in the mmW, it is possible to increase a beamforming (BF) gain to increase coverage or increase throughput by using multiple antenna elements.

In this case, if a transceiver unit (TXRU) is provided so that transmission power and phase may be adjusted for each antenna element, independent beamforming is possible for each frequency resource. However, when the TXRUs are installed on all 100 antenna elements, there is a problem that effectiveness is deteriorated in terms of costs. Therefore, a method of mapping a plurality of antenna elements to one TXRU and adjusting a direction of a beam using an analog phase shifter is considered. Such an analog BF method has a disadvantage in that frequency selective BF may not be performed by making only one beam direction in all bands.

A hybrid BF with B TXRUs, which is an intermediate form of digital BF and analog BF, and fewer than Q antenna elements, may be considered. In this case, although there is a difference depending on a connection method of B TXRUs and Q antenna elements, the number of directions of the beams that may be transmitted at the same time is limited to B or less.

Hereinafter, representative examples of a method of connection method of TXRUs and antenna elements will be described with reference to the accompanying drawing.

Figure 11A:
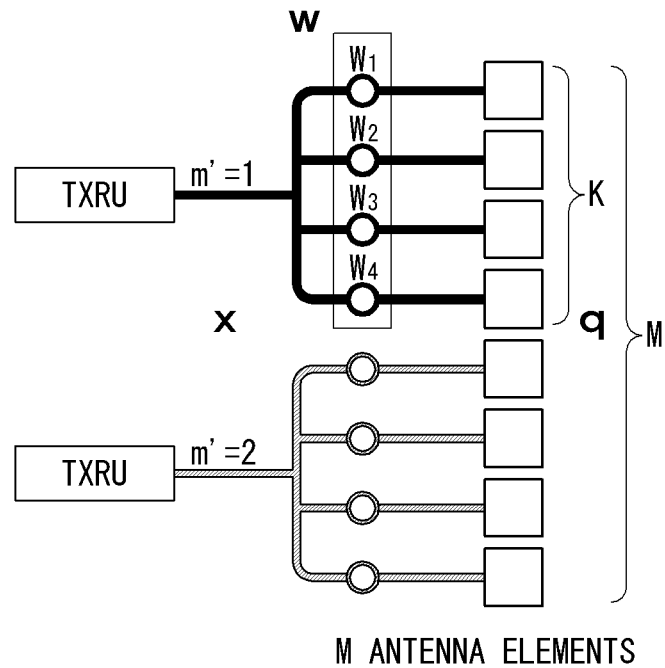
FIGS. 11A and 11B illustrate a transceiver unit model in the wireless communication system to which the present invention may be applied.
Figure 11B:
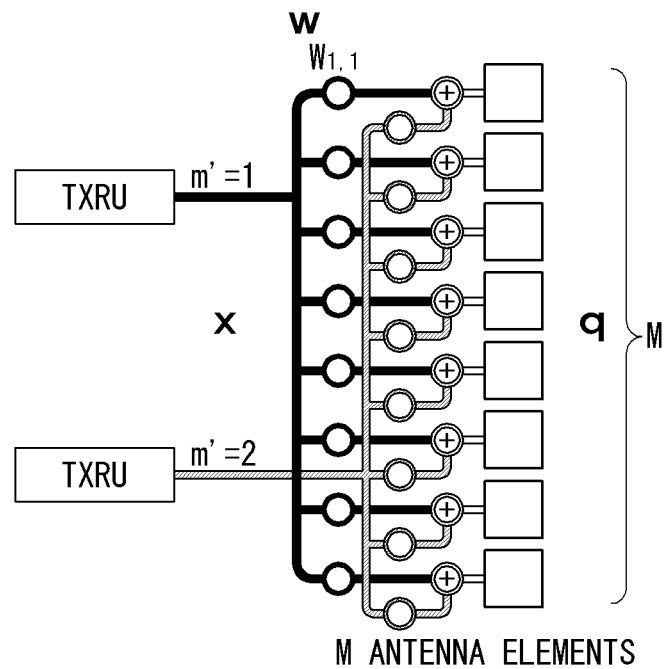

FIGS. 11A and 11B show a transceiver unit model in a radio communication system to which the present invention may be applied.

A TXRU virtualization model shows a relationship between an output signal of the TXRUs and an output signal of the antenna elements. According to the correlation between the antenna element and the TXRU, The TXRU virtualization model may be divided into TXRU virtualization model option-1 and a sub-array partition model as illustrated in FIG. 11A and TXRU virtualization model option-2 and a full-connection model as illustrated in FIG. 11B.

Referring to FIG. 11A, in the case of the sub-array partition model, the antenna element is divided into multiple antenna element groups and each TXRU is connected to one of the groups. In this case, the antenna element is connected to only one TXRU.

Referring to FIG. 11B, in the case of the full-connection model, signals of multiple TXRUs are combined and transmitted to a single antenna element (or an array of antenna elements). That is, a scheme is illustrated, in which the TXRU is connected to all antenna elements. In this case, the antenna element is connected to all TXRUs.

In FIGS. 11A and 11B, q represents a transmission signal vector of antenna elements having M co-polarized waves in one column. w represents a wideband TXRU virtualization weight vector and W represents a phase vector multiplied by an analog phase shifter. In other words, the direction of analog beamforming is determined by W. x represents a signal vector of M_TXRU TXRUs.

Herein, mapping of the antenna ports and the TXRUs may be 1-to-1 or 1-to-many.

In FIGS. 11A and 11B, the mapping (TXRU-to-element mapping) between the TXRU and the antenna element is merely an example, and the present invention is not limited thereto. The present invention may be similarly applied even to mapping between the TXRU and the antenna element, which may be implemented in various other forms in terms of hardware.

Feedback of Channel State Information (CSI)

In a 3GPP LTE/LTE-A system, user equipment (UE) is defined to report channel state information (CSI) to a base station (BS or eNB).

The CSI collectively refers to information that may indicate the quality of a radio channel (or referred to as a link) formed between the UE and the antenna port. For example, a rank indicator (RI), a precoding matrix indicator (PMI), a channel quality indicator (CQI), and the like correspond to the information.

Here, the RI represents rank information of a channel, which means the number of streams received by the UE through the same time-frequency resource. Since this value is determined depending on the long term fading of the channel, the value is fed back from the UE to the BS with a period usually longer than the PMI and the CQI. The PMI is a value reflecting a channel space characteristic and represents a preferred precoding index preferred by the UE based on a metric such as signal-to-interference-plus-noise ratio (SINR). The CQI is a value representing the strength of the channel, and generally refers to a reception SINR that may be obtained when the BS uses the PMI.

In the 3GPP LTE/LTE-A system, the BS configures a plurality of CSI processes to the UE and may receive CSI for each process. Here, the CSI process is constituted by a CSI-RS for signal quality measurement from the BS and a CSI-interference measurement (CSI-IM) resource for interference measurement.

Reference Signal (RS) Virtualization

In the mmW, it is possible to transmit a PDSCH only in one analog beam direction at a time by analog beamforming. In this case, data transmission from the BS is possible only to a small number of UEs in the corresponding direction. Therefore, if necessary, the analog beam direction is differently configured for each antenna port so that data transmission may be simultaneously performed to a plurality of UEs in several analog beam directions.

Figure 12A:
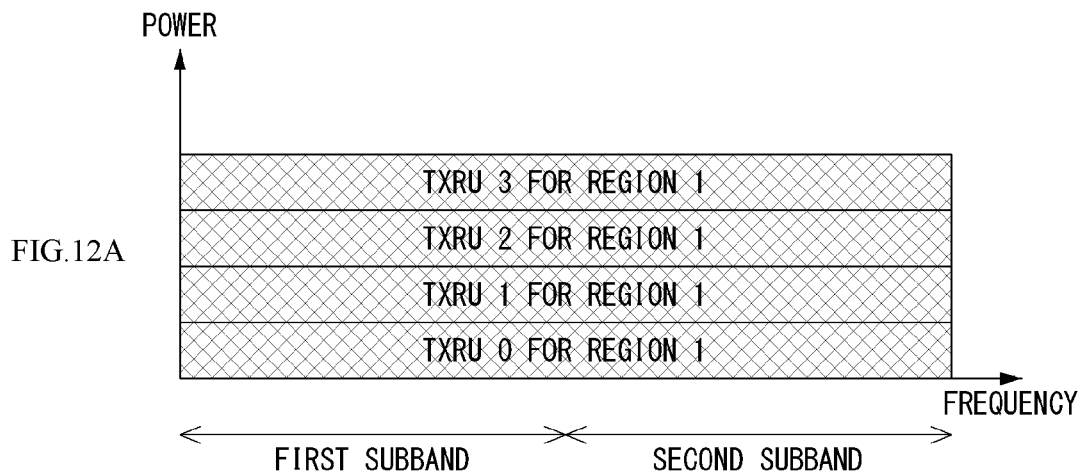
FIGS. 12A though 12C is a diagram illustrating a service area for each transceiver unit in the wireless communication system to which the present invention may be applied.
Figure 12B:
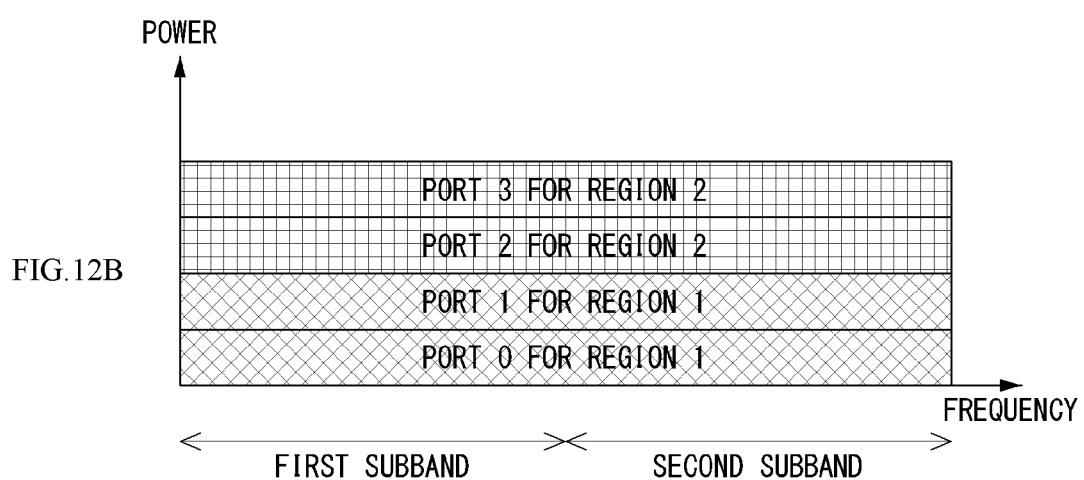
Figure 12C:
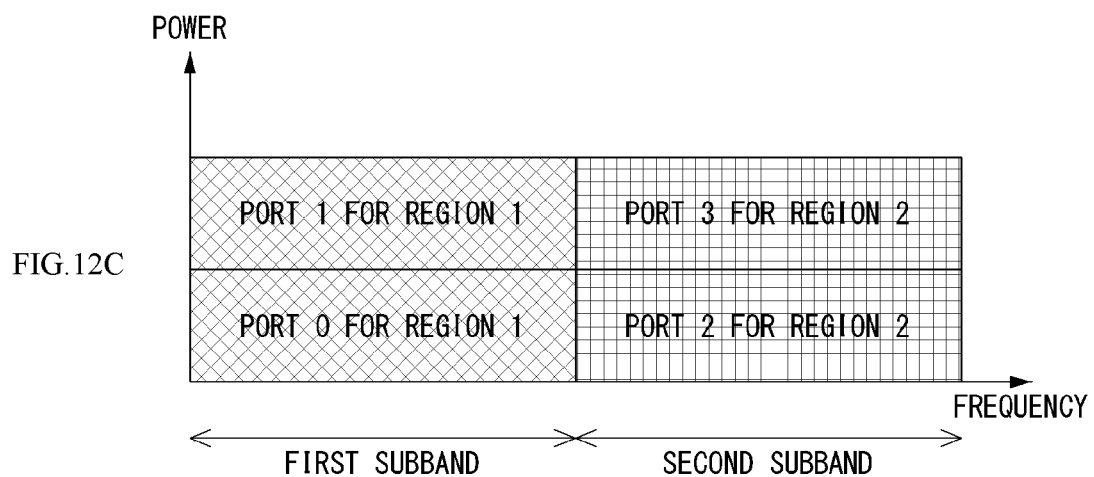

FIGS. 12A through 12C are diagrams illustrating a service area for each transceiver unit in the wireless communication system to which the present invention may be applied.

In FIGS. 12A through 12C, 256 antenna elements are divided into 4 parts to form a 4 sub-arrays, and the structure of connecting the TXRU to the sub-array will be described as an example as shown in FIGS. 11A and 11B above.

When each sub-array is constituted by a total of 64 (8×8) antenna elements in the form of a 2-dimensional array, specific analog beamforming may cover an area corresponding to a 15-degree horizontal angle area and a 15-degree vertical angle area. That is, the zone where the BS should be served is divided into a plurality of areas, and services are provided one by one at a time.

In the following description, it is assumed that the CSI-RS antenna ports and the TXRUs are 1-to-1 mapped. Therefore, the antenna port and the TXRU have the same meaning as the following description.

As shown in FIG. 12A, if all TXRUs (antenna ports, sub-arrays) (that is, TXRU 0, 1, 2, 3) have the same analog beamforming direction (that is, region 1), the throughput of the corresponding zone may be increased by forming digital beam with higher resolution. Also, it is possible to increase the throughput of the corresponding zone by increasing the rank of the transmission data to the corresponding zone.

As shown in FIGS. 12B and 12C, if each TXRU (antenna port, sub-array) (that is, TXRU 0, 1, 2, 3) has a different analog beamforming direction (that is, region 1 or region 2, the data may be transmitted simultaneously to UEs distributed in a wider area in the subframe (SF).

As an example shown in FIGS. 12B and 12C, two of the four antenna ports are used for PDSCH transmission to UE1 in region 1 and the remaining two antenna ports are used for PDSCH transmission to UE2 in region 2.

Particularly, in FIG. 12B, PDSCH1 transmitted to UE1 and PDSCH2 transmitted to UE2 represent examples of spatial division multiplexing (SDM). Unlike this, as shown in FIG. 12C, PDSCH1 transmitted to UE1 and PDSCH2 transmitted to UE2 may also be transmitted by frequency division multiplexing (FDM).

Among a scheme of serving one area using all the antenna ports and a scheme of serving many areas at the same time by dividing the antenna ports, a preferred scheme is changed according to the rank and the modulation and coding scheme (MCS) servicing to the UE for maximizing the cell throughput. Also, the preferred method is changed according to the amount of data to be transmitted to each UE.

The BS calculates a cell throughput or scheduling metric which may be obtained when one area is served using all the antenna ports, and calculates the cell throughput or scheduling metric which may be obtained when two areas are served by dividing the antenna ports. The BS compares the cell throughput or the scheduling metric which may be obtained by each scheme to select the final transmission scheme. As a result, the number of antenna ports participating in PDSCH transmission is changed by SF-by-SF. In order for the BS to calculate the transmission MCS of the PDSCH according to the number of antenna ports and reflect the calculated transmission MCS to a scheduling algorithm, the CSI feedback from the appropriate UE is required.

Beam Reference Signal (BRS)

Beam reference signals are transmitted on one or more antenna ports (p={0, 1, . . . , 7}).

The reference-signal sequence 'r_l(m)' may be defined by Equation 14 below.

$$r_l(m) = \frac{1}{\sqrt{2}}(1 - 2 \cdot c(2m)) + j\frac{1}{\sqrt{2}}(1 - 2 \cdot c(2m+1)), \quad \text{Equation 14}$$

$$m = 0, 1, \ldots, 8 \cdot (N_{RB}^{max,DL} - 18) - 1$$

Where l=0, 1, . . . , 13 is the OFDM symbol number. N_RB^max,DL represents the largest downlink band configuration and N_scARB is expressed by a multiple. N_sc^RB represents the size of the resource block in the frequency domain and is expressed by the number of subcarriers.

In Equation 14, c(i) may be predefined as a pseudo-random sequence. The pseudo-random sequence generator may be initialized at the start of each OFDM symbol by using Equation 15 below.

$$C_{init} = 2^{10} \cdot (7 \cdot (n_s+1) + l'+1) \cdot (2 \cdot N_{ID}^{cell}+1) + 2 \cdot N_{ID}^{cell}+1 \quad \text{Equation 15}$$

Where N_ID^cell represents a physical layer cell identifier. n_s=floor(l/7) and floor(x) represents a floor function for deriving a maximum integer of x or less. l'=l mod 7 and mod represents a modulo operation.

Beam Refinement Reference Signal (BRRS)

Beam refinement reference signals (BRRSs) may be transmitted on up to eight antenna ports (p=600, . . . , 607). The transmission and reception of the BRRS are dynamically scheduled in the downlink resource allocation on xPDCCH.

The reference-signal sequence 'r_l,ns(m)' may be defined by Equation 16 below.

$$r_{l,n_s}(m) = \frac{1}{\sqrt{2}}(1 - 2c(2m)) + j\frac{1}{\sqrt{2}}(1 - 2c(2m+1)), \quad \text{Equation 16}$$

$$m = 0, 1, \ldots, \left\lfloor \frac{3}{8} N_{RB}^{max,DL} \right\rfloor - 1$$

Where n_s represents the slot number in the radio frame. l represents the OFDM symbol number in the slot. c(i) may be predefined as the pseudo-random sequence. The pseudo-random sequence generator may be initialized at the start of each OFDM symbol by using Equation 17 below.

$$c_{init} = 2^{10}(7(\bar{n}_s+1)+l+1)(2N_{ID}^{BRRS}+1)+2N_{ID}^{BRRS}+1$$

$$\bar{n}_s = n_s \mod 20 \quad \text{Equation 17}$$

Herein, N_ID^BRRS is configured to the UE through the RRC signaling.

DL Phase Noise Compensation Reference Signal

Phase noise compensation reference signals associated with xPDSCH may be transmitted on antenna port(s) p=60 and/or p=61 according to the signaling in the DCI. Further, the phase noise compensation reference signals associated with xPDSCH may be present as a valid reference for phase noise compensation only if the xPDSCH transmission is associated with the corresponding antenna port. In addition, the phase noise compensation reference signals associated with xPDSCH may be transmitted only on the physical resource blocks and symbols upon which the corresponding xPDSCH is mapped. Moreover, the phase noise compensation reference signals associated with xPDSCH may be identical in all symbols with xPDSCH allocation.

For any antenna port p ∈ {60,61}, the reference-signal sequence 'r(m)' is defined by Equation 18 below.

$$r(m) = \frac{1}{\sqrt{2}}(1 - 2 \cdot c(2m)) + j\frac{1}{\sqrt{2}}(1 - 2 \cdot c(2m+1)), \quad \text{Equation 18}$$

$$m = 0, 1, \ldots, \lfloor N_{RB}^{max,DL}/4 \rfloor - 1$$

Herein, c(i) may be predefined as the pseudo-random sequence. The pseudo-random sequence generator may be initialized at the start of each subframe by using Equation 19 below.

$$c_{init} = (\lfloor n_s/2 \rfloor + 1) \cdot (2n_{ID}^{(nSCID)}+1) \cdot 2^{16} + n_{SCID} \quad \text{Equation 19}$$

Where n_SCID is 0 if unless specified otherwise. In the xPDSCH transmission, n_SCID is given in a DCI format associated with the xPDSCH transmission.

n_ID^(i) (where i=0, 1) is given as follows. When the value of n_ID^PCRS,i is not provided by the higher layer, n_ID^(i) is equal to N_ID^cell. If not, n_ID^(i) is equal to n_ID^PCRS,i.

According to the conference of 3GPP RAN1 #86, DL Layer 1 (L1)/Layer (L2) beam management procedures are supported within the following one or multiple transmission reception points (TRPs).

i) P-1: P-1 is used to enable UE measurements on different TRP Tx beams to support selection of TRP transmission (Tx) beam(s)/UE reception (Rx) beam(s).

For beamforming in the TRP, P-1 includes intra-TRP/inter-TRP Tx beam sweeps from a set of different beams.

For beamforming in the UE, P-1 includes UE Rx beam sweeps from a set of different beams.

The TRP Tx beam and the UE Rx beam may be jointly or individually determined.

ii) P-2: P-2 is used to enable UE measurements on different TRP Tx beams so as to change inter/intra-TRP Tx beam(s).

A smaller set of beams for beam refinement than in P-1 may be used.

P-2 may be regarded as a special case of P-1.

iii) P-3: P-3 is used to enable UE measurement on the same TRP Tx beam to change UE Rx beam in the case where the UE uses beamforming.

The same procedure may be designed for intra-TRP beam measurement and inter-TRP beam measurement.

The UE may not know the intra-TRP beam or the inter-TRP beam.

For example, procedures P-2 and P-3 described above may be performed jointly and/or multiple times to achieve TRP Tx/UE Rx beam change simultaneously.

Managing multiple Tx/Rx beam pairs may be supported for a single UE.

Assistance information from another carrier is being discussed to be transferred to the UE in a beam management procedure.

The above procedure can be applied to any frequency band.

The above procedure can be used in single/multiple beam(s) per TRP.

Further, according to the conference of 3GPP RAN1 #86bis, the following UL beam management is to be further studied in NR.

A procedure similar to downlink beam management may be defined.

i) U-1: U-1 is used to enable TRP measurements on different UE Tx beams in order to support selection of the UE Tx beam(s)/TRP Rx beam(s).

This may not necessarily be used in all cases.

ii) U-2: U-2 is used to enable TRP measurements on different TRP Rx beams so as to change/select the inter/intra-TRP Rx beam(s).

iii) U-3: U-3 is used to enable TRP measurement on the same TRP Rx beam to change UE Tx beam in the case where the UE uses beamforming.

Indication of information related to Tx/Rx correspondence may be supported.

UL beam management is studied based on: Physical Random Access Channel (PRACH), Sounding Reference Signal (SRS), and Demodulation Reference Signal (DM-RS) (Other channels and reference signals (RS) are not precluded).

As described below, the uplink (UL) beam management procedure needs to be studied by considering the Tx/Rx beam correspondence.

For the case where both the TRP and the UE have the Tx/Rx beam correspondence

For the case where the TRP does not have the Tx/Rx beam correspondence and/or the UE does not have the Tx/Rx beam correspondence Further, the following aspects should be considered for UL power control (PC) design:

No LTE-like cell-specific reference signal for path loss estimate

Beam-based transmissions/receptions

Analog beamforming at eNB/UE

Multi-beam/multi-stream transmissions

Multiple numerologies

Inter-TRP information exchange

Dynamic TDD may be studied afterwards and other aspects are not precluded.

Further, the following design of UL PC is studied as a starting point:

Fractional power control in LTE as framework

DL RS for path loss measurement, e.g., RS in DL beam management P-1, P-2 and P-3 for multi-beam scenario or single-beam scenario Separate PC settings for UL control and data channel For UL PC, numerology-specific parameter setting and separate PC settings for multi-beam/multi-stream UL may be studied afterwards.

Further, according to the conference of 3GPP RAN1 #87, in the NR, for NR-PUSCH in at least targeting enhanced mobile broadband (eMBB), Open-loop power control based on pathloss estimate is supported. In this case, pathloss is estimated using DL RS for measurement. Further, fractional power control is supported. For which measurement DL RS(s) is used (The RS may be beamformed) may be studied afterwards.

Closed-loop power control is supported, which is based on NW signaling. In this case, dynamic UL-power adjustment is considered.

The followings may be additionally studied:

Numerology specific power control, e.g., numerology specific power control parameters Beam specific power control parameters Power control for other RSs and physical channels Power control for grant free PUSCH if supported Power control per layer (group)

Further, in the NR, the CSI-RS supports DL Tx beam sweeping and UE Rx beam sweeping. In this case, the CSI-RS may be used in P-1, P-2, and P-3.

The NR CSI-RS supports the following mapping structure.

N_P CSI-RS port(s) may be mapped for each (sub) time unit.

Throughout the (sub) time unit, the same CSI-RS antenna ports may be mapped.

A value of N_P is studied afterwards.

Here, "time unit" means n (>=1) OFDM symbols in configured/reference numerology. Whether consecutive or inconsecutive OFDM symbols comprising the time unit is studied afterwards.

Port multiplexing method (e.g., FDM, TDM, CDM, any combinations) is studied afterwards.

Each time unit may be divided into sub-time units.

Partitioning method (e.g., TDM, interleaved FDMA (IF-DMA), OFDM symbol-level partition with same/shorter OFDM symbol length (i.e. larger subcarrier spacing) as/than the reference OFDM symbol length (subcarrier spacing), and other methods are not precluded) is studied afterwards.

Such a mapping structure may be used to support multiple panels/Tx chains.

CSI-RS mapping options for Tx and Rx beam sweeping are described below.

i) Option 1: Tx beam(s) are the same across sub-time units within each time unit. Tx beam(s) are different across time units.

ii) Option 2: Tx beam(s) are different across sub-time units within each time unit. Tx beam(s) are the same across the time units.

iii) Combination of Option 1 and Option 2:

The Tx beam(s) are the same across the sub-time units within one time unit.

The Tx beam(s) are different for each sub-time unit within another time unit.

Here, for example, a combination of the different time units in terms of e.g., number and periodicity is studied afterwards.

Only Tx sweeping or Rx sweeping may be possible and another option is also not precluded.

Whether the above mapping structure is configured with one or multiple CSI-RS resources is studied afterwards.

Uplink Transmission/Reception Method

A name of the eNB described in the patent is used as a comprehensive term including remote radio head (RRH), eNB (or gNB), transmission point (TP), reception point (RP), a relay, and the like. Hereinafter, for convenience of description, a proposal method will be described based on a 3GPP LTE system and/or a new RAT (NR) system. However, a range of the system to which the proposal method is applied may be extended to other systems (e.g., UTRA, and the like) other than the 3GPP LTE system.

Hereinafter, a UL transmission power control method in the NR will be described.

In NR system design, it is being considered to introduce new features in UL such as OFDM based UL transmission and single symbol UL control channel. The present invention proposes a method in which a UL power control procedure should be considered, which includes basic components such as pathloss compensation, power offset, Transmit Power Control (TPC) command, and some additional feature.

Basic Parameters for the UL Power Control 1-1) Pathloss Compensation

According to UL power control in current LTE system, two types of pathloss compensation are considered; one is full pathloss compensation, and the other is fractional pathloss compensation.

In NR system, it might be considered that UE measures reference signal received power (RSRP) by using a certain type of DL RS (e.g., synchronization signal, CSI-RS, etc.), and then the UE derives pathloss between the UE and its associated eNB by using the measured (high-layer filtered) RSRP.

UL transmission power from UE may be compensated fully or partially by considering the estimated pathloss.

First of all, full pathloss compensation may maximize fairness for cell-edge UEs. In other words, the power received from cell-edge UE at the gNB (i.e., base station) may be comparable with the power received from cell-center UE.

On the other hand, if fractional pathloss compensation is used, the received power at gNB side from cell-center UE may be much higher than that from cell-edge UE. The pathloss of cell-edge UE may be compensated by adjusting other power parameter or offset so that the received power from cell-edge UE may be properly controlled. However, the received power from cell-center UE may be redundant due to the already sufficient amount of received power in general.

In case of UL data channel transmission, such redundant power can be used to improve spectral efficiency by applying higher Modulation and Coding Scheme (MCS) level (for instance, cell-center UE may be able to use smaller number of PRBs for same TB size). On the other hand, in case of UL control channel transmission using fixed amount of resources, it is unclear how to use the redundant power to improve spectral efficiency since an uplink Control Information (UCI) (payload) size is not dependent upon UE location or channel condition. Hence, it is not desirable to consider full compensation for the power control of the UL control channel.

Furthermore, in case of fractional pathloss compensation for UL data channel transmission, the received power difference between the cell-center UE and the cell-edge UE may be adjusted by using a value of a fractional pathloss compensation factor, and this value may be different according to a cell radius and target performance.

Therefore, for the power control of the UL control channel (e.g., PUCCH, etc.), it is desirable to consider the full pathloss compensation.

1-2) Power Offset Depending on Data Rate

In general, it is expected that higher transmission power is required to support higher data rate. However, it may be inefficient for the power control of the UL data channel to use both fractional pathloss compensation and power offset (i.e., Delta_TF setting in the LTE standard) depending on the data rate simultaneously. Moreover, in current LTE, this type of power offset is not supported for higher rank than 2. Therefore, it needs to be considered to support only the fractional pathloss compensation in the NR without power offset setting depending on the data rate.

For the power control of the UL data channel, it needs to be considered to support only the fractional pathloss compensation in the NR without the power offset setting depending on the data rate.

1-3) TPC Command

The TPC command may be used to compensate channel variations due to fast fading. Regarding current LTE, PUCCH power may be adjusted by the TPC command signaled in DL assignment DCI while PUSCH (or SRS) power may be adjusted by the TPC command signaled in UL grant DCI. Besides, for the UL transmissions without associated DCI such as semi-persistent scheduling (SPS), periodic CSI, or SRS, the TPC command may be signaled to a certain UE group by using DCI format 3/3A. There may be two types of TPC procedures for the update of UL transmission power; one is accumulative TPC, and the other is absolute TPC. The accumulative TPC is suitable for fine-tuning of UE transmission power by using relatively small step size of TPC values. On the other hand, the absolute TPC may be useful to boost the UE transmission power at once by using relatively large step size of TPC values.

W the aspects of pathloss compensation are investigated, it is desirable to consider aspects of the pathloss, the power offset, and the TPC command for the design of the UL power control procedure for the NR, with consideration of cell deployment, a UL physical channel type (e.g. control or data), and a wireless channel condition.

Additional Features for Power Control in NR 1-4) Beamforming Operation

In the NR design, it may be necessary to consider introduction of analog (or hybrid) beamforming based operation, especially for high frequency band (e.g. above 6 GHz). With the analog beamforming, gNB TX/RX beam sweeping (e.g. TDM between different gNB TX/RX beams) may be required to be done not only for the transmission of DL common signal and information such as synchronization signal (e.g. PSS/SSS in LTE) or broadcast system information (e.g. Physical Broadcast Channel (PBCH) in LTE) but also for the transmission of DL/UL control and data channels, in order to serve the UEs located in different areas (or beam directions).

In this case, it may be necessary to consider differentiation of power control parameters between different beams for the UE since the required power for UL performance is different per beam for the UE.

However, especially for accumulative TPC procedures, it needs to be further studied whether PC parameter separation per beam is superior compared with a common TPC accumulation process regardless of beam changes or switching. The latter means that the TPC accumulation process will not be reset even though a serving beam is changed by a beam management procedure, considering that the already stabilized transmit power level is desired to remain as much as possible unless such beam changes occur to a different TRP.

For targeted service (e.g., Ultra-Reliable and Low-Latency (URLLC) and enhanced Vehicle-to-Everything (eV2X) requiring higher reliability, there may be a configurable additional power offset to be applied on the TPC accumulation process whenever beam change or switching occurs within the same TRP so as to alleviate potential power control mismatch due to the beam change/switching. Further, this may be applied for retransmission cases to improve HARQ performance, which needs to be done following higher-layer configurations provided by the gNB.

For accumulative TPC procedures, a configurable additional power offset to be applied on a common TPC accumulation process needs to be considered, whenever beam change or switching occurs within the same TRP, depending on a targeted service (e.g., URLLC and eV2X) requiring higher reliability.

In this regard, when the proposal of the present invention will be described in more detail, the following issues need to be considered in relation to "Beam specific power control parameters" in the UL PC related contents of the above-mentioned 3GPP RAN1 #87conference.

An issue should be considered, in which how transmit power control (TPC) is performed (when the UE transmits UL) while a reception point (e.g., the eNB) targeted by a transmission signal is the same (by specific beam management), when an Rx beam of the reception point is changed (and/or when the Tx beam of a transmitter (e.g., the eNB) is changed).

As a solution for the issue, in one method, TPC chain/process/parameter(s) for each specific beam may be independently configured. As a result, independent power control for each beam may be applied. The reason is that when a transmission/reception beam direction is changed, a best transmission power level may be changed due to a change in reception interference environment, etc.

However, independently performing the power control may not continuously guarantee a best operation. Since the reception point itself is not changed but only a Tx/Rx beam applied to the same transmission/reception point is changed, it may be more advantageous to maintain a PC which is maintained (stabilized) in the related art, such as TPC accumulation, etc. as possible in terms of performance than application of a rapid TPC change.

However, since best power control according to beam change/switching may be slightly changed, at least one technique among techniques proposed below may be applied to increase reliability by considering the slight change of the best power control.

As described above, a TPC process depending on the beam change/switching is not initialized with respect to the same TRP.

In this case, as an example of a method that allows the UE to recognize the same TRP, "case where beam change/switching occurs based on CSI-RS configured in form of (sub-) time unit" may become a condition. That is, when the condition of "case where beam change/switching occurs based on CSI-RS configured in form of (sub-) time unit" is satisfied, the same TRP may be recognized. For example, the corresponding RS is configured for a specific beam management purpose and/or in a single CSI-RS resource configuration or a plurality of CSI-RS configurations, but a specific group among the plurality of CSI-RS configurations is configured (i.e., the same TRP characteristic is configured to be known, etc.), that is, the same TRP may be implicitly (or explicitly) recognized.

For example, under a condition in which a specific group of the corresponding DL RS (e.g., CSI-RS)/SS(s) "which does not initialize the TPC process (i.e., shares TPC accumulation and/or follows the same UL PC process)" is implicitly configured, a rule may be defined/configured, which is determined so that RS/SS(s) which similarly receives the same Tx power value and/or the open-loop P0 value become the same group. In addition, in the case of the beam change/switching in the group, the TPC accumulation may be inherited/shared (e.g., may be the same UL PC process).

In this case, in the case of an explicit indication, specific Quasi Co-Located (QCL) signaling capable of identifying the same TRP, etc. may be explicitly indicated to the UE. For example, specific explicit configuration/signaling is provided to allow the specific RS/SS(s) for the purpose to become the same group, and as a result, the TPC accumulation may be inherited/shared in the case of the beam change/switching in the group (e.g., may be the same UL PC process).

Additionally, when the beam change/switching occurs in the same TRP, a specific power offset value (e.g., P_offset_beam) to be added to a power control process may be RRC-configured (and/or a second layer (L2) level configuration such as a medium access control (MAC) control element (CE), etc. and/or a first layer (layer 1) level configuration such as DCI, etc.) (at one time). That is, in the case of the TPC accumulation, when the beam change/switching occurs, the power offset value (e.g., P_offset_beam) may be added to a current power value. This is to increase the reliability.

The power offset value may be RRC-configured (and/or an L2 level configuration such as MAC CE, etc. and/or an L1 level configuration such as DCI, etc.) differently/independently for each specific service (e.g., V2X, URLLC, eMBB, . . . , or a specific L1 parameter which may correspond to each service, e.g., for each radio network temporary identifier (RNTI)).

In The parts described in the above description with the expression "beam change/switching", the operations of "beam change" and "beam switching" may be particularly distinguished.

For example, the beam change may mean that only a single serving beam is configured and a serving beam is changed. In addition, the beam switching may mean a case where multiple serving beams are configured and dynamic beam switching is performed. For example, beam cycling based ((semi-) OL transmission) defined/configured by a specific (time-domain) pattern.

In the case of the beam change, how a beam change command is to be delivered to the UE should be preferentially considered. More specifically, if the beam change command is delivered to an L1 signal (e.g., a DCI) or an L2 signal (e.g., a MAC CE), the power offset value of a large range/high resolution within the message may be delivered.

In addition, a beam switching command may also be delivered to the UE with the L1 signal (e.g., DCI) or the L2 signal (e.g., MAC CE). The (separate) specific power offset value(s) within the message is delivered to implicitly or explicitly indicate even information indicating when the specific power offset value is to be applied. For example, when switching periodicity related information of beam switching/cycling is together configured or separately configured, the power offset value(s) may be configured to be applied whenever specific beam switching occurs. For example, a pattern switched after the same beam is transmitted twice may be configured as an operation of applying the power offset value only in first transmission which is switched and transmitted and not applying the power offset value in second transmission.

In addition/alternatively, an indication whether to inherit a previous TPC accumulation value or to reset the previous TPC accumulation value at the time of delivering the beam change command (and/or beam switching command) may also be together delivered to the UE. For example, the indication may be included in a corresponding L1 and/or L2 command message.

When the previous TPC accumulation value is indicated to be inherited from the eNB, a TPC value (e.g., +X dB, 0 dB, or −Y dB, . . . ) indicated in a specific closed-loop TPC field (transmitted together) may be accumulated and applied to a current TPC accumulation value (further, the power offset value may be additionally summed here (either once or every time the beam is changed in the case of the beam switching)).

When the previous TPC accumulation value is indicated to be reset from the eNB, a TPC value (e.g., +X dB, 0 dB, or −Y dB, . . . ) indicated in a specific closed-loop TPC field (transmitted together) may be applied as an initial TPC accumulation value on a newly initialized (reset) PC process (e.g., an OLPC component may be calculated and thereafter, newly applied here as an initial TPC accumulation value) (further, the power offset value may be additionally summed here (either once or every time the beam is changed in the case of the beam switching)).

Further, transmission of the SRS may be required for close-loop PC and in this case, a relationship between an SRS transmission time and a beam/change/switching command deliver time also needs to be definitely prescribed. For example, when the beam change (or switching) is performed from beam 1 to beam 2, SRS for a direction of beam 2 may be generally transmitted after the beam change, but an operation is defined/configured so as to transmit for a direction of beam 2 before the beam change, and as a result, more accurate PC may be performed. To this end, with which beam the UE is allowed to transmit the SRS in aperiodic SRS triggering (e.g., via an L1 message) may be explicitly indicted to the UE. Alternatively, an operation may be configured, to perform a plurality of SRS transmission at a time for a specific predefined "SRS beam set" which configured in advance (separately). For example, in a situation where candidate beams that may be a subject to which the SRS transmission are defined/configured as beam 1, beam 2, . . . , beam 4, the "SRS beam set" may include all of four beams and for example, may be configured to include only beam 2 and beam 3 (here, such a configuration may then be reconfigured by a third layer (L3) (e.g., RRC) and/or L2 (e.g., MAC) and/or L1 (e.g., DCI)). When a specific "SRS beam set" is thus configured and the specific SRS triggering message is received, the UE may operate to perform both SRS transmission for beam 2 and SRS transmission for beam 3 to SRS resource(s) indicated by the corresponding triggering (or configured in advance by interlocking with the triggering).

In addition, a fallback mode power control scheme may be defined/configured, which is applied when the same TRP Rx beam is maintained by beam blockage or the like, but when only the UE Tx beam needs to be changed. For example, during a UL beam sweeping process, while separate/independent power control parameter(s) for the second best beam (pair) are determined/configured/stored, the UE may be configured to initiate specific UL transmission (e.g., SRS transmission, PUCCH transmission, and/or PUSCH transmission) by the specific fallback mode power control. As a more specific example, assumed is a state in which a first best Tx beam and/or Rx beam (pair), a second best Tx beam and/or Rx beam (pair), . . . , information in a specific direction are determined by specific UL beam management and the information is reported from the UE to the eNB or the information is provided from the eNB to the UE. Initially, transmission/reception with beamforming considering the 1st best Tx beam and/or Rx beam (pair) is started at specific UL transmission (for example, SRS transmission, PUCCH transmission, and/or PUSCH transmission) of the UE. In this case, when retransmission occurs due to a failure of decoding in the receiver (e.g., the eNB) with respect to the transmission signal (e.g., the eNB feeds back NACK), or the like, the fallback mode power control and/or an operation of performing other beam-based transmission may be defined/configured. In particular, in a system to which "synchronous HARQ" is applied, in a situation where a separate specification scheduling grant for retransmission is not provided and is defined/configured to start retransmission according to an appointed timeline, a specific Tx beam and/or Rx beam and/or specific power offset parameter(s) (including the P_offset_beam value for each retransmission) applied at n-th retransmission (n=1, 2, . . . ) is defined/configured in a specific pattern in advance to provide the information to the UE and the UE may be configured/indicated to start the UL transmission based on the information.

More specifically, in this case, a different method may be applied depending on whether a target of the UL transmission is PUCCH or PUSCH. For example, in the PUCCH, the eNB uses/applies power control parameter(s) (including a related P_offset_beam value (for each retransmission)) when the 2nd best UE Tx beam is used with respect to a TRP Rx beam tailored to a 1st best (UL) beam pair and in the PUSCH, the eNB uses/applies power control parameter(s) (including a related P_offset_beam value (for each retransmission)) for a 2nd best UL beam pair, that is, an associated configuration may be provided to the UE and the UE may operate to initiate the corresponding transmission based on the provided configuration.

A specific k-th best Tx and/or Rx beam (pair) applied when the fallback type transmission occurs (e.g., specific n-th retransmission) may be configured to have a relatively wider beam width. Therefore, the k-th best Tx and/or Rx beam (pair) may be configured/applied for the corresponding fallback purpose (e.g., a purpose for coping with error occurrence for the 1st best beam (pair)). Alternatively, a scheme of configuring/restricting an operation by starting transmission by the aforementioned specific "beam switching" may also be applied during the fallback transmission (e.g., n-th retransmission).

1-5) Power Transmission Period

In general, it is expected that the amount of information conveyed via UL data channel is much larger than UL control channel. Therefore, the required power for the UL data channel transmission may be larger than that of the UL control channel. For the NR design, TDM is considered for multiplexing structure between UL data and control channels for latency reduction, flexible UL/DL configuration, and analog beamforming. In case when UL data and control channels are multiplexed by TDM manner, it may be necessary to handle power imbalance between those two different channels which may be relatively larger compared to current LTE. Moreover, considering various OFDM numerology (e.g. different sub-carrier spacing or symbol duration) used for the NR, it is necessary to handle the power transmission period between the UL data and the control channel for certain numerology (e.g. large sub-carrier spacing).

It is desirable to consider additional features for UL power control in the NR such as an analog beamforming operation and the power transmission period.

1-6) Per-TRP and Per-Layer Power Control

A coordinated transmission technique across multiple intra/inter-TRPs is discussed. Especially for high frequency bands in the NR, the number of dominant rays per TRP or single panel may be limited (e.g., mostly observed by up to rank 2). Therefore, in order to achieve high Single User-MIMO (SU-MIMO) spectral efficiency, coordinated transmission schemes across multiple TRPs need to be thoroughly investigated in the NR, including Coordinated MultiPoint (CoMP), Dynamic Point Selection (DPS), and independent-layer Joint Transmission (JT). When a DLrelated DCI indicates the transmission rank and an applied coordinated scheme, the DCI decoding latency at the UE side may be one major problem whenever analog beamforming is applied for a given time instance. This is because the DCI transmission may be conducted by a serving TRP but the actual data transmission may be performed by another TRP as an example.

In case of independent-layer JT where particular layer(s) may be transmitted from different TRPs, the corresponding UL transmission power per layer-group may need to be configured and controlled by gNB, since at least the pathloss from different TRPs may be different. Further, separated UL power control process targeting different TRPs needs to be further studied in the UL-CoMP context.

UL power control per TRP and per layer-group needs to be further investigated, at least for properly supporting DPS and independent-layer JT in the NR.

Hereinafter, a UL beam-specific power control method in the NR will be described.

The following agreements are made on UL power control:
 i) For beam specific power control, the NR defines beam specific open and closed loop parameters.

Here, details on "beam specific", especially regarding handling layer/layer-group/panel specific/beam group specific/beam pair link specific power control will be discussed afterwards.

ii) gNB is aware of the power headroom differences for different waveforms, if the UE may be configured for different waveforms. The details of offset and power control parameters (e.g., P_c, Max or other open/closed loop parameter will be discussed afterwards.

iii) Codebook based transmission for UL is supported at least by signaling the following information in UL grant:
 Sounding Resource Indicator (SRI)+Transmit Precoding Matrix Indicator (TPMI)+Transmit Rank Indicator (TRI)

Here, TPMI is used to indicate a preferred precoder over the SRS port(s) in the SRS resource selected by the SRI.

If a single SRS resource is configured, there is no SRI. In this case, TPMI is used to indicate a preferred precoder over the SRS port in the single configured SRS resource.

Selection of multiple SRS resources is supported.

A proposal according to the present invention for beam-specific UL power control will be described based on the above agreements.

It has been agreed to support differentiation of beam-specific open and closed loop parameters between different beams for a UE since the required power for UL performance would be different per beam for a UE.

However, especially for accumulative TPC procedures, it needs to be further studied whether PC parameter separation per beam is superior compared with a common TPC accumulation process regardless of beam changes or switching. The latter means that the TPC accumulation process will not be reset even though a serving beam is changed by a beam management procedure, considering that the already stabilized transmit power level is desired to remain as much as possible unless such beam changes occur to a different TRP.

Per targeted service (e.g., URLLC and eV2X requiring higher reliability, there may be a configurable additional power offset to be applied on the TPC accumulation process whenever beam change or switching occurs within the same TRP so as to alleviate potential power control mismatch due to the beam change/switching.

For accumulative TPC procedures, a configurable additional power offset to be applied on a common TPC accumulation process needs to be considered, whenever beam change or switching occurs within the same TRP, depending on a targeted service (e.g., URLLC and eV2X) requiring higher reliability.

Regarding Open Loop Power Control (OLPC), proper DL RS such as a Synchronization Signal (SS) block (PBCH DMRS) and CSI-RS for pathloss compensation should be defined at least for UEs supporting beam correspondence. Considering UL-CoMP operations, different DL RS for pathloss compensation can be configured per SRS resource for UL CSI acquisition.

For example, the above proposed contents may be applied as follows:
 PL_c(q_d) is downlink pathloss in dB, which is calculated by the UE by using a reference signal (RS) resource q_d with respect to a serving cell c.

Here, the UE may be configured with the number of RS resources by higher layer parameter (e.g., 'num-pusch-pathlossReference-rs') indicating the number of PUSCH pathloss reference RSs.

In addition, each set of RS configurations for the number of RS resources may be provided by a higher layer parameter (e.g., pusch-pathloss-Reference-rs) indicating PUSCH pathloss reference RS. Here, the higher layer parameter (e.g., pusch-pathloss-Reference-rs) indicating PUSCH pathloss reference RS may include one or both of a set of SS/PBCH block indexes provided by a higher layer parameter (e.g., 'pusch-pathlossReference-SSB) indicating a PUSCCH pathloss reference synchronization signal block (SSB) and a set of CSI-RS configuration indexes provided by a higher layer parameter (e.g., cpusch-pathlossReference-CSIRS') indicating PUSCH pathloss reference CSI-RS.

The UE may identify an RS resource in the set of RS resources to correspond to the SS/PBCH block or to the CSI-RS configuration as an information (value) provided by a higher layer parameter (e.g., 'pusch-pathlossreference-index') indicating a PUSCH pathloss reference index.

If the UE is configured by higher layer parameter (e.g., 'SRS-SpatialRelationInfo') a mapping between a set of SRS resources and a set of RS resources for obtaining a downlink pathloss estimate, the UE uses the RS resources indicated by a value of a SRI in a DCI format (e.g., DCI format 0_0 or DCI format 0_1) that schedules the PUSCH transmission to obtain the downlink pathloss estimate. That is, when a parameter (e.g., SRS-SpatialRelationInfo) indicating the SRS spatial relation information set to the higher layer indicates one CSI-RS or one SSB, the UE may apply the parameter to calculation of the pathloss (PL).

In addition, the parameter may be configured (or set) for each SRS resource or SRS resource set (for example, higher layer signaling (RRC, etc.)) as described above.

The RRC parameters may be set as shown in Table 6 below.

TABLE 6

| | Configuration of spatial relation between reference RS and target RS. Reference RS is SSB/ | |
|---|---|---|
| SRS-SpatialRelationInfo | CSI-RS/SRS. | Included in SRS-ResourceConfig |
| num-pusch-pathlossReference-rs | The number of DL RS configurations for measuring pathloss Individual pathloss estimations are maintained by the UE and used for PUSCH power | |

TABLE 6-continued

| SRS-SpatialRelationInfo | Configuration of spatial relation between reference RS and target RS. Reference RS is SSB/ CSI-RS/SRS. | Included in SRS-ResourceConfig |
|---|---|---|
| pusch-pathlossReference-rs-config | control, for each configuration. N RS configurations may be configured. When a PUSCH beam indication is present, N is 1, 2, 3, or 4 and otherwise, N = 1 Configuration (e.g., CSI-RS configuration or SS block) to be used for PUSCH pathloss estimation N RS configurations may be configured. | |
| pusch-pathlossReference-SSB | | Present in pusch-pathlossReference-rs-config |
| pusch-pathlossReference-CSIRS | | Present in pusch-pathlossReference-rs-config |
| pusch-pathlossReference-rs | | Present in pusch-pathlossReference-rs-config |
| pathlossreference-index | Index corresponding to each RS of the PL reference RS configuration | Present in pusch-pathlossReference-rs-config |

However, the above operation may be limited to be applicable only when the higher layer parameter (e.g., "SRS-SpatialRelationInfo") indicating the SRS spatial relation information indicates one CSI-RS or one SSB. That is, if the higher layer parameter (e.g., "SRS-SpatialRelation-Info") indicating the SRS spatial relation information indicates one (another) SRS resource (this case may correspond to a case "without beam correspondence"), an operation may be defined/configured/indicated, which calculates the pathloss based on a DL RS such as a separately configured or preconfigured DL RS (e.g., one CSI-RS or one SSB) (and/or, e.g., determined by a predefined/configured function or rule based on a default type of the DL RS such as an SS block (PBCH DMRS) or a set of configured CSI-RSs) as proposed below.

And/or if the parameter ("SRS-SpatialRelationInfo") indicating the SRS spatial relation information indicates one (another) SRS resource as described above, when the indicated SRS resource itself is configured, if the parameter ("SRS-SpatialRelationInfo") indicating the separate/independent SRS spatial relation information indicates one CSI-RS or one SSB, this may be applied in the path loss calculation. That is, a parameter ("SRS-SpatialRelation-Info") indicating the SRS spatial relation information, which is a sub-parameter for the SRS resource itself indicated by the SRI field in the DCI, indicates one (another) SRS resource (UL beam management (for Beam Management (BM)), if a parameter ("SRS-SpatialRelationInfo") indicating the SRS spatial relation information, which is a sub-parameter for this resource, indicates one CSI-RS or one SSB, it is possible to indicate the DL RS spanning multiple stages in such a method in which the parameter is applied to the pathloss calculation. This indirect indication scheme may be generalized in such a manner that one (another) continued SRS resource is reached over several stages as indicated, so that the indicated specific DL RS is applied to the pathloss calculation.

For a UE without beam correspondence, pathloss compensation may be performed by the predefined/configured function or rule based on the default type of the DL RS, such as the SS block (PBCH DMRS) and/or the set of configured CSI-RSs. In other words, the UE may calculate a downlink path loss estimation value via RSRP calculated using the DL RS (e.g., SS block and/or CSI-RS) and calculate uplink power as inverse compensation based on the downlink pathloss estimation value.

That is, such DL RS (e.g., SS block (PBCH DMRS) and/or a set of configured CSI-RSs) information may be configured separately for the UE (e.g., by RRC, MAC CE and/or DCI). Then, the UE may perform the pathloss compensation operation based thereon.

And/or even if the DL RS information is not separately configured by the eNB, the UE may perform the pathloss compensation operation based on specific DL RS (e.g., the SS block (PBCH DMRS) and/or the set of configured CSI-RSs) for the serving cell. In this case, for example, the specific DL RS may correspond to at least one DL RS (reported previously or last) that has default DL RS or a lowest (or highest) index (when sorted to an average power level (e.g., RSRP)) or a best power level based on information based thereon.

And/or, at the same time, a specific calculation function such as a maximum operation or a specific weighted average function may be defined/configured. For example, a max function or some weighted averaging functions may be defined to perform the pathloss compensation for the cases of without beam correspondence.

Therefore, for OLPC, proper DL RS for the pathloss compensation should be defined or configured per SRS resource. In addition, a predefined/configured function for the pathloss compensation should be determined for the UE without the beam correspondence.

In regard to transmission for codebook based transmission for UL, the SRI in UL grant may indicate selection of multiple SRS resources.

The multiple SRS resources may support multi-panel joint transmission in UL. Furthermore, each panel transmission associated with each indicated SRS resource may target different UL reception points (RPs) in the context of UL-CoMP.

To properly support this, the NR network should be able to at least calculate accurate MCS per different layer group corresponding to different SRS resources (or different SRS sets (groups)), with a separated power control process per SRS resource.

Therefore, multiple ULPC processes for the UE need to be supported, and each ULPC process may be associated with at least one SRS resource configured to the UE.

For example, configured SRS resource identifiers (IDs) #1 and #2 may be associated to the same ULPC process A, while another configured SRS resource ID #3 may be associated to other ULPC process B. ULPC processes A and B may target different reception points.

That is, the ULPC process may mean that the same parameter (e.g., a dB-unit power value (P0) indicated by the eNB for the uplink power control, reference signal (e.g., SSB, CSI-RS, etc.) information used for estimating the downlink pathloss to be calculated by the UE, an alpha value by which the downlink pathloss estimation value calculated by the UE is multiplied in order to compensate for the downlink pathloss estimation) is used for the power control of uplink transmission (i.e., uplink reference signal (e.g., SRS) and uplink channel (e.g., PUSCH and PUCC)). Therefore, in the above example, one or more SRS resources associated with the same ULPC process may mean that the same power control parameter is applied when the UE transmits the SRS in the corresponding SRS resource. Consequently, in the above example, one ULPC process may be associated with one or more SRS resources and when the one or more SRS resources are grouped into the SRS resource set (group), it may be appreciated that parameters for the power control are individually set for each SRS resource set. That is, according to the above description, it may be interpreted that SRSs #1 and #2 belong to one SRS resource set (group), and as a result, a parameter for common power control may be applied.

In addition, the SRS resources #1 and #2 which follow the same ULPC process A may be dynamically selected by the SRI indication in UL grant. That is, on which SRS resource the UE should transmit the SRS between the SRS resources #1 and #2 which belong to one SRS resource set may be indicated to the UE by the SRI field in the UL grant.

For example, when SRS resources #1 and #3 are jointly indicated by the SRI field in the UL grant, this may be interpreted as a layer-group-separated UL multi-panel transmission operation or a UL-CoMP joint reception operation at the gNB side.

In this case, independent power control may be performed for each indicated SRS resource. And/or the rank/layer number may be indicated separately (in the same UL grant) for each indicated SRS resource. And/or (separate) TPMI information tailored thereto may be provided for each indicated SRS resource (in the same UL grant). That is, in this case, since SRS resources (i.e., SRS resources #1 and #3) which belong to different SRS resource sets (groups) are simultaneously indicated to the UE, it may be interpreted that the independent power control is performed for each SRS resource.

In other words, a plurality of SRS resources (i.e., belonging to different SRS resource sets, i.e., associated with different TRPs) may be indicated simultaneously by one SRI field in the UL grant, and for each of the plurality of SRS resources, different layer groups may be configured. In this case, the parameter set for the power control of the PUSCH may be individually determined for each layer group.

Consequently, to properly support multi-panel UL transmission and UL-CoMP operations, multiple ULPC processes (i.e., multiple SRS resource sets (groups) to which the same power control parameter is applied for each SRS resource set (group)) for the UE should be supported and each ULPC process (i.e., each SRS resource set (group)) may be associated with at least one SRS resource configured to the UE.

In the above description, for convenience of description, two SRS resource sets (groups) are assumed and two SRS resources are indicated through one SRI field. However, this is for convenience of description and the present invention is not limited thereto.

Hereinafter, a UL transmission power control method in the NR will be described.

The following agreements are made on UL power control:
i) NR supports beam specific pathloss for ULPC.
ii) The following DL RS may be used for pathloss (PL) calculation for ULPC.
    If the power offset between SSS and DM-RS for PBCH is known by the UE, both SSS of the SS block and DM-RS for PBCH are used.
    If the power offset between SSS and DM-RS for PBCH is not known by the UE, only the SSS of SS block is used.
    CSI-RS is used.
iii) In aperiodic SRS transmission triggered by a single aperiodic SRS triggering field, the UE may be configured to transmit N (N>1) SRS resources for UL beam management.

Hereinafter, the UL power control method in the NR will be described based on the above agreements.

It has been agreed to support differentiation of beam-specific open and closed loop parameters between different beams for the UE in the NR since the required power for UL performance is different per beam for a UE.

However, especially for accumulative TPC procedures, it needs to be further studied whether PC parameter separation per beam is superior compared with a common TPC accumulation process regardless of beam changes or switching. The latter means that the TPC accumulation process will not be reset even though a serving beam is changed by a beam management procedure, considering that the already stabilized transmit power level is desired to remain as much as possible unless such beam changes occur to a different TRP.

Per targeted service (e.g., URLLC and eV2X requiring higher reliability, there may be a configurable additional power offset to be applied on the TPC accumulation process whenever beam change or switching occurs within the same TRP so as to alleviate potential power control mismatch due to the beam change/switching.

For accumulative TPC procedures, a configurable additional power offset to be applied on a common TPC accumulation process needs to be considered, whenever beam change or switching occurs within the same TRP, depending on a targeted service (e.g., URLLC and eV2X) requiring higher reliability.

In respect to the OLPC, considering the UL-CoMP operations, different DL RS for pathloss compensation can be configured per SRS resource for UL CSI acquisition. For a UE without beam correspondence, pathloss compensation may be performed by the predefined/configured function or rule based on the default type of the DL RS, such as the SS block (PBCH DMRS) and/or the set of configured CSI-RSs. For example, a max function or some weighted averaging functions may be defined to perform the pathloss compensation in the case of without beam correspondence.

In the OLPC, a predefined/configured function for the pathloss compensation should be determined for the UE without the beam correspondence.

Considering the agreements regarding codebook based transmission for UL, SRI in UL grant may indicate selection of multiple SRS resources, which can support multi-panel joint transmission in UL. Furthermore, each panel transmission associated with each indicated SRS resource may target different UL reception points (RPs) in the context of UL-CoMP. To properly support this, NR network should be able to at least calculate accurate MCS per different layer group corresponding to different SRS resource, with also separated power control process per SRS resource. In general, multiple ULPC processes for the UE need to be supported, and each ULPC process may be associated with at least one SRS resource (and/or at least DL RS/SS for the OLPC as described above) configured to the UE.

In addition/alternatively, specific corresponding configured DL RS/SS(s) to be subjected to OLPC per ULPC process may be switched to another RS/SS (e.g., via MAC CE and/or DCI). In addition/alternatively, (one-time) additional power offset/bias values to be applied at this time may be indicated (together) (to extend to a larger range than the normal TPC range) and the UE may be defined/configured/ indicated to reflect the additional power offset/bias values to TPC accumulation. For example, configured SRS IDs #1 and #2 may be associated to the same ULPC process A, while another configured SRS resource ID #3 may be associated to other ULPC process B. ULPC processes A and B may target different reception points. In addition, the SRS resources #1 and #2 which follow the same ULPC process A may be dynamically selected by the SRI indication in UL grant. For example, when SRS resources #1 and #3 are jointly indicated by the SRI field in the UL grant, this may be interpreted as a layer-group-separated UL multi-panel transmission operation or a UL-CoMP joint reception operation at the gNB side.

Consequently, to properly support multi-panel UL transmission and UL-CoMP operations, multiple ULPC processes (i.e., multiple SRS resource sets (groups) to which the same power control parameter is applied for each SRS resource set (group)) for the UE should be supported and each ULPC process (i.e., each SRS resource set (group)) may be associated with at least one SRS resource configured to the UE.

In addition/alternatively, groups of specific ULPC process(s) configured explicitly/implicitly as described above may share Closed Loop Power Control (CLPC), so that when the UE performs uplink power control, the UE may be defined/configured to apply/accumulate the TPC accumulation together. For example, the OLPC may be separated/divided (independently) for each process, but the CLPC may be configured to be shared. In addition/alternatively, the OLPC as well as the CLPC may be configured to be independently separated/divided and applied for each processor.

In addition/alternatively, when scheduling specific UL data (i.e., a PUSCH) in a specific UL grant to the eNB, it is possible to explicitly indicate transmission of UL data (i.e., PUSCH) according to a certain ULPC process (i.e., the uplink power control is performed by applying a parameter set for specific power control) in the corresponding UL grant. That is, a field for explicitly indicating which ULPC is applied to perform UL data transmission may be included in the UL grant.

In addition/alternatively, the UE may be implicitly indicated to follow the specific ULPC process at the time of the power control of scheduled UL data (i.e., PUSCH) by interlocking with a specific existing DCI field (or value) (e.g., an HARQ identifier (ID)). In other words, depending on the existing DCI field (or value), it may be implicitly indicated which parameter set for the power control is to be used.

For example, a specific HARQ ID value may interlock with a specific ULPC identifier (ID) in advance (e.g., via RRC and/or MAC CE). That is, the mapping relationship between the HARQ ID and the ULPC ID may be configured in advance (for example, via RRC and/or MAC CE). In addition, the UE may transmit the uplink by determining the uplink transmission power by applying the interlocking ULPC process according to with which HARQ ID the UE is scheduled by the DCI (i.e., applying the corresponding power control parameter set).

In this case, as an example, the specific HARQ ID(s) may be associated with a specific independent service type (e.g., eMBB or URLLC) and thus there is an effect of allowing different power levels to be determined for each specific communication service type. For example, the URLLC may be configured to transmit at a relatively higher power than the eMBB.

In other words, a form may be configured/applied in which a specific service type (e.g., eMBB or URLLC) is linked in advance (for example, via RRC/MAC CE, etc.) for each specific HARQ ID(s). Therefore, it is possible to initiate data-type specific scheduling by L1 signaling (e.g., by DCI, associated with HARQ ID) to transmit an uplink data packet for a specific service type (e.g., eMBB or URLLC).

In addition/alternatively, a specific ULPC may be implicitly indicated by interlocking with a specific existing DCI field (value) (e.g., the SRI field described above). In other words, depending on the SRI field (or value), which parameter set for the uplink power control is to be used may be implicitly indicated.

For example, a specific SRI field value (e.g. indicating SRS resource(s)) may interlock with a specific ULPC ID in advance (e.g., RRC and/or MAC CE). That is, the mapping relationship between the SRI field value and the ULPC ID may be configured in advance (for example, via RRC and/or MAC CE). In addition, the UE may determine the uplink transmission power and transmit the uplink by applying the corresponding interlocking ULPC process (i.e., applying the uplink power control parameter set) according to which SRI(s) value is indicated and scheduled by the DCI.

In this case, as an example, the specific SRI(s) value may be associated with the uplink transmission panel(s) of a specific UE and/or the target reception point(s) of the eNB. Therefore, there is an effect that the eNB provides the flexibility to allow the UE to perform uplink transmission at different power levels by different ULPC processes.

In addition/alternatively, through a form such as a specific common DCI (e.g., transmitted on a common search space (CSS), for example, a form similar to LTE DCI 3/3A), each ULPC process may be mapped to an independent state and/or UE index (e.g., a specific RNTI value). Accordingly, for which ULPC process TPC (accumulation) is to be performed may be transmitted at a time (to multiple UEs) (in the CSS format).

As a result, in an example of the most flexible method among the above-mentioned methods, the eNB may independently inform the UE of which target RP/beam and/or UE Tx panel is indicated through individual SRI fields. At the same time, it may be indicated separately what power control to apply via the individual specific ULPC process indicators and depending on which service type (e.g., indicated via RRC and/or MAC CE) uplink data is to be transmitted may be indicated through specific individual service-type indicators. High flexibility of the uplink scheduling combination may be supported by using the separately indicated types or the like.

Regarding N (>1) aperiodic SRS transmission triggered by single aperiodic SRS triggering field, an issue on transmission power for the N SRS resources for UL beam management may be resolved in general by proper UL power control mechanisms as mentioned above per configured SRS resource (group).

For example, gNB may associate specific N SRS resources to the same ULPC process. Then the same transmission power may be guaranteed for the N SRS resources for beam management. An additional method may be discussed, for configuring the triggering state description by RRC and/or MAC CE to override the current transmission power level per SRS resource according to associated ULPC process. This is to enforce the same Tx power level for N SRS resources regardless of current ULPC process(es) (e.g., applying the highest current SRS Tx power to one of N SRS resources similarly to other N−1 SRS resources). That is, even if there is a specific ULPC process that is already followed for each SRS resource for determining the transmission power for the N (>1) aperiodic SRS resources to be triggered together, the UE may be configured/indicated to (additionally) perform at least one operation described below (in addition to information indicating which specific N resources or not basically) in a description (e.g., configured via RRC and/or MAC CE) regarding an operation which the UE is to perform when the corresponding triggering state itself may be dynamically indicated.

Like a scheme of "applying the highest current SRS Tx power to one of N SRS resources similarly to other N−1 SRS resources" described above, when there are N power values determined according to the current ULPC process with respect to N SRS resources, respectively, N corresponding SRS transmission powers may be configured to be equal to a specific value among the N power values. Here, the specific value may include is the largest value (or the smallest value for reducing interference with (other cell), etc.) among the N power values determined according to the ULPC process or a value (e.g., average, weighted average, etc.) calculated through a specific defined/configured function to yield a representative power value with the N power values. In addition/alternatively, after the power level is equalized, if the power level exceeds a maximum power amount (e.g., $P\_c\_MAX$) that may be maximally transmitted, the power level may be configured to be scaled down according to a corresponding restriction value all at once. In addition/alternatively, if a power sharing rule is defined/configured, which is to be applied to signals (e.g., PUCCH, PUSCH, etc.) to be transmitted to another specific uplink, the target power level to be scaled down may be set to a target power level according to the power sharing rule/to which the power sharing rule is to be applied.

As another scheme, not in a scheme of calculating a specific "highest power level" and setting the target power level to the highest power level described above, the same power level may be configured to be set to "full power" applicable (even though there are specific ULPC process(es) applied for each SRS resource (group) unit at present, continuously by disregarding the specific ULPC process(es)) with respect to the N SRS resources all at once (i.e., overriding). In addition/alternatively, after the power level is equalized, if the power level exceeds a maximum power amount (e.g., $P\_c\_MAX$) that may be maximally transmitted, the power level may be configured to be scaled down according to a corresponding restriction value all at once. In addition/alternatively, if a power sharing rule is defined/configured, which is to be applied to signals (e.g., PUCCH, PUSCH, etc.) to be transmitted to another specific uplink, the target power level to be scaled down may be set to a target power level according to the power sharing rule/to which the power sharing rule is to be applied.

As yet another scheme, not in the scheme of calculating a specific "highest power level" and setting the target power level to the highest power level described above, even though there are specific ULPC process(es) applied for each SRS resource (group) unit at present, by disregarding the specific ULPC process(es), the same power level may be configured to be set to a specific "predefined/preconfigured power level/value" to be continuously applied when (N) SRS resources for specific UL beam management are to be together transmitted (and/or a power level/value determined by the OLPC (and in association even with specific representative CLPC) with respect to specific predefined/preconfigured DL RS and/or specified representative DL RS) all at once (overriding). Here, the specified representative DL RS may include (serving) SS block DMRS (i.e., for PBCH) (by initial access/random access channel (RACH) procedure and/or beam management (BM) procedure) and/or SSS and/or specific (e.g., lowest-index) CSI-RS. In addition/alternatively, after the power level is equalized, if the power level exceeds a maximum power amount (e.g., $P\_c\_MAX$) that may be maximally transmitted, the power level may be configured to be scaled down according to a corresponding restriction value all at once. In addition/alternatively, if a power sharing rule is defined/configured, which is to be applied to signals (e.g., PUCCH, PUSCH, etc.) to be transmitted to another specific uplink, the target power level to be scaled down may be set to a target power level according to the power sharing rule/to which the power sharing rule is to be applied.

As still yet another scheme, when there is at least one specific (link adaptation (LA)) ULPC process which is maintained (activated) (with respect to a specific beam) at present, the uplink transmission may be configured to be performed by setting a specific power value determined by the ULPC process to the same power level for the N SRS resources (and/or by adding a specific configured/indicated single power offset thereto) all at once. In other words, this means that the power level determined by the normal link adaptation ULPC (e.g., associated with PUSCH PC) (plus $P\_SRS\_offset$) is applied to the transmission of SRS resource(s) for beam management as it is and the same power is applied even to a beam management SRS resource corresponding to a different (analog) beam pair from the link adaptation SRS resource among them. This is to indicate transmission of the beam management SRS resources in order to test which beam pair among beam pairs other than the current serving beam pair in a situation in which the beam management SRS resources are transmitted. Further, the reason is that it may be still meaningless to configure an individual ULPC process among the beam management (N) SRS resources. In summary, the individual ULPC processes may be configured/applied among the link adaptation SRS resource(s), but the individual ULPC processes (or a separate ULPC process separated from link adaptation) may not be configured among the beam management SRS resource(s). In addition/alternatively, after the power level is equalized, if the power level exceeds a maximum power amount (e.g., $P\_c\_MAX$) that may be maximally transmitted, the power level may be configured to be scaled down according to a corresponding restriction value all at once. In addition/alternatively, if a power sharing rule is defined/configured, which is to be applied to signals (e.g., PUCCH, PUSCH, etc.) to be transmitted to another specific uplink, the target power level to be scaled down may be set to a target power level according to the power sharing rule/to which the power sharing rule is to be applied.

Even when the specific aperiodic SRS triggering state is configured to transmit specific M (>=1) SRS resources (for CSI acquisition) as well as the specific N SRS resources (for beam management) (i.e., when the specific aperiodic SRS triggering state is configured to simultaneously transmit a total of N+M SRS resources), at least one of the proposed methods may be applied in a such a manner of replacing N in the above proposed schemes with "N+M". That is, in this case, even in a case where SRS resources for different purposes are mixed as well as a case where only the beam management SRS resources are together transmitted, the SRS resources may be transmitted by applying the specific power level (i.e., the same specific power) like the method proposed above by disregarding (i.e., overriding) the situation in which each ULPC process is applied by such a scheme.

Alternatively, it may be restricted/configured that at least one of the above proposals is applied only to N without replacing N in the proposed schemes with "N+M" as described above. That is, N+M SRS resources are together transmitted, but only N SRS resources among them may be transmitted by applying the specific power level (e.g., the same specific power) only the transmission power for N SRS resources like the proposed method. In addition, simultaneously, M SRS resource(s) may be transmitted while applying the power level power-controlled according to the specific ULPC process associated with M corresponding SRS resources (in advance), respectively to the transmission power of the other M SRS resource(s) as they are. This is caused by a difference in purpose of the SRS transmission.

Further, in the above proposed methods, it may be interpreted that the most is described based on a fact that both N and/or M SRS resources are aperiodic SRS types, but it is apparent that at least one of the schemes proposed in the present invention above may be extensively applied even to a case where some of them are semi-persistent SRS types and/or periodic SRS types. That is, the scheme may be applied only to the same specific SRS transmission instance and even though the multiple specific SRS resources are scattered and transmitted to different SRS transmission instances, the SRS transmission may be performed by overriding a part of determination of the transmission power by the already interlocking ULPC process(es) and applying the power control for some multiple SRS resources to the specific power level (e.g., to the same specific power) (only temporarily/during a specific interval).

In addition/alternatively, with respect to the at least one proposal method, an operation (this may be interpreted as power control adjustment) that performs SRS transmission by overriding to the specific power level (e.g., the same specific power) may be temporarily applied only to a specific SRS transmission interval (cycle). That is, in addition, the SRS transmission may be configured to be performed at another independent specific power level (e.g., at the same specific power) with respect to another SRS transmission interval (cycle). The power control adjustment may be performed independently for each specific interval (cycle).

For example, at least one operation in the above-described method may be temporarily applied only to an interval of "one round of SRS beam sweeping". In addition, at least one operation in the above-described another independent method may be defined to be applied or configured/indicated to the UE by the eNB with respect to a next/another interval of "one round of SRS beam sweeping".

Figure 13:
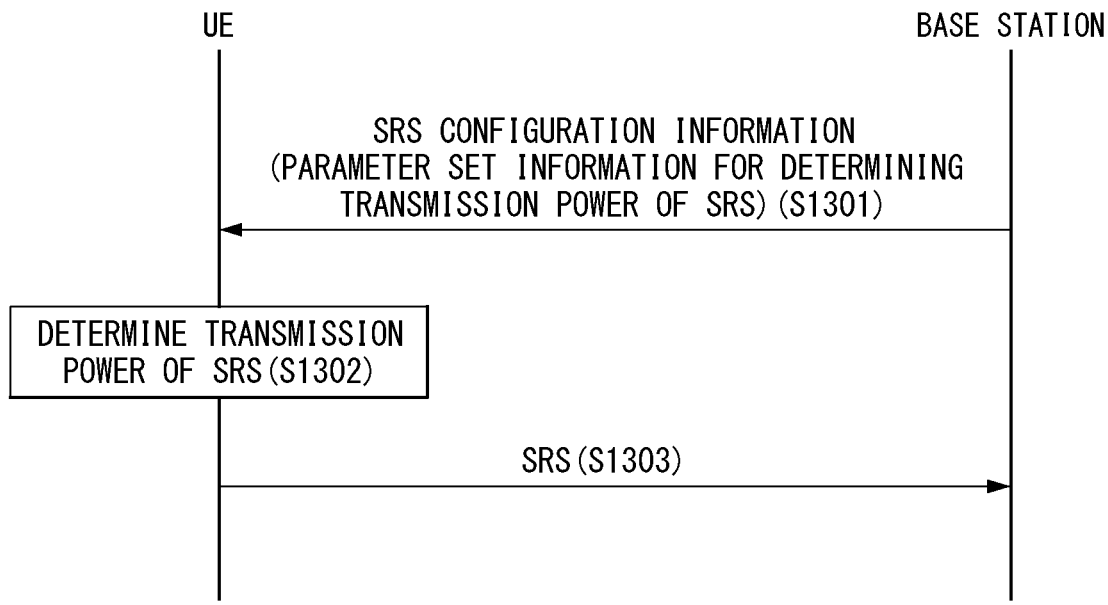
FIG. 13 is a diagram illustrating a method for transmitting and receiving an uplink according to an embodiment of the present invention.

FIG. 13 is a diagram illustrating a method for transmitting and receiving an uplink according to an embodiment of the present invention.

Referring to FIG. 13, the UE receives SRS configuration control information (DCI) from the eNB (S1301).

Here, the SRS configuration information may include a parameter set (including, e.g., a default power value P0, an inverse compensation information/ratio α, a downlink reference signal for estimation/calculation of pathloss, etc.) for power control of SRS for each SRS resource set and the SRS resource set may include one or more SRS resources.

The UE determines transmission power of the SRS based on the parameter set of the power control of the SRS (S1302).

Here, the transmission power of the SRS may be determined based on the downlink pathloss estimation value calculated by the UE using the downlink reference signal indicated by the parameter set for the power control of the SRS. In this case, the downlink reference signal may be indicated by higher layer signaling (RRC or MAC CE). For example, the downlink reference signal may include SSB and CSI-RS.

In addition, the downlink reference signal may be changed by signaling (e.g., MAC CE, DCI, etc.) transmitted by the eNB.

Further, the UE may determine the transmission power of the SRS by commonly applying TPC accumulation to an SRS resource set (e.g., for a specific SRS resource set (group) configured explicitly/implicitly).

A power control adjustment for adjusting the transmission power of the SRS may be independently applied for each specific SRS transmission interval. Here, when the power control adjustment is triggered, transmission power values of the SRS on all SRS resources may be adjusted equally regardless of determination of the transmission power of the SRS. Specifically, an operation of performing the SRS transmission by overriding at specific power level (e.g., at the same specific power) may be temporarily applied only to a specific SRS transmission interval (cycle). In addition, the SRS transmission may be configured to be performed at another independent specific power level (e.g., at the same specific power) with respect to another SRS transmission interval (cycle). Further, when the adjusted transmission power value exceeds a predetermined value, the adjusted transmission power value may be scaled down all at once.

The UE transmits the SRS to the eNB with the determined transmission power (S1303).

Although not illustrated in FIG. 13, an operation for controlling an operation for transmitting an uplink channel (PUSCH and PUCCH)/an operation for controlling transmission power of the uplink channel may be performed in conjunction with the SRS transmission/reception operation in FIG. 13.

Specifically, the UE receives downlink control information (DCI) including physical uplink shared channel (PUSCH) scheduling information from the eNB. Here, the DCI may include a SRS resource indicator (SRI). In addition, the UE determines the PUSCH transmission power based on the parameter set for the power control of the PUSCH determined from the SRI.

In this case, the UE may receive from the eNB one or more parameter sets (e.g., a default power value P0, an inverse compensation information/ratio α, a downlink reference signal for estimating/calculating pathloss, etc.) for the power control of the PUSCH and calculate the PUSCH transmission power based on the parameter set indicated by the SRI.

Further, when a plurality of SRS resources is indicated by the SRI, and different layer groups are configured with respect to the plurality of SRS resources, respectively, the parameter set for the power control of the PUSCH may be individually determined for each layer group.

Even in this case, the transmission power of the PUSCH may be determined based on the downlink pathloss estimation value calculated by the UE using the downlink reference signal indicated by the parameter set for the power control of the PUSCH. Further, the downlink reference signal may be changed by signaling (MAC CE, DCI, etc.) transmitted by the eNB. In addition, the UE transmits the PUSCH to the eNB with the determined transmission power.

On the other hand, when information on the downlink reference signal is not provided from the eNB (for example, when the SRI in the DCI is not included), the pathloss estimation value may be calculated by using a specific downlink reference signal (e.g., a downlink reference signal having a relatively highest power level).

Overview of Devices to which Present Invention is Applicable

Figure 14:
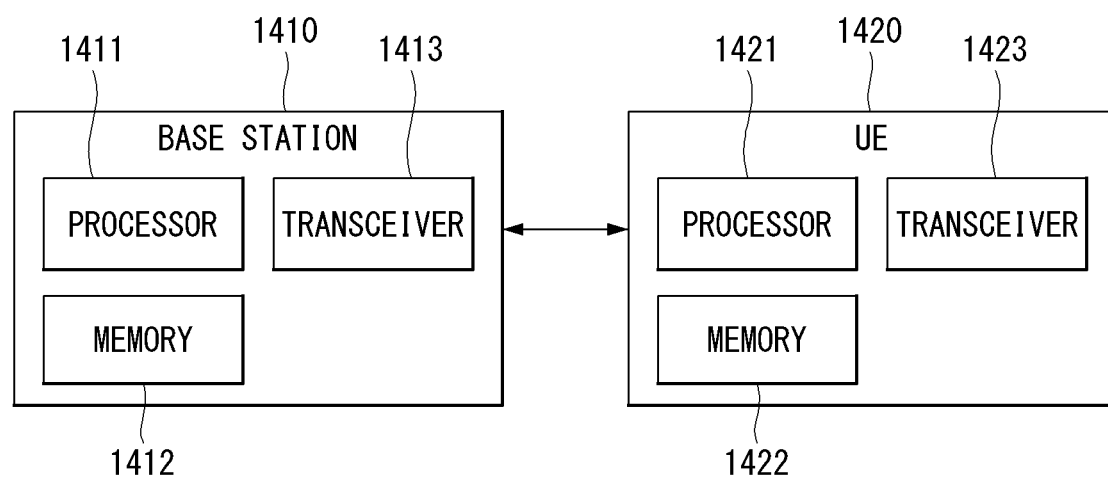
FIG. 14 illustrates a block diagram of a wireless communication apparatus according to an embodiment of the present invention.

FIG. 14 illustrates a block diagram of a wireless communication apparatus according to an embodiment of the present invention.

Referring to FIG. 14, a wireless communication system includes a base station 1410 and multiple UEs 1410 positioned within an area of the base station 1420.

The eNB 1410 includes a processor 1411, a memory 1412, and a transceiver or a radio frequency (RF) unit 1413. The processor 1411 implements a function, a process, and/or a method which are proposed in FIGS. 1A to 13 above. Layers of a radio interface protocol may be implemented by the processor 1411. The memory 1412 is connected with the processor 1411 to store various pieces of information for driving the processor 1411. The RF unit 1413 is connected with the processor 1411 to transmit and/or receive a radio signal.

The UE 1420 includes a processor 1421, a memory 1422, and an RF unit 1423. The processor 1421 implements a function, a process, and/or a method which are proposed in FIGS. 1A to 13 above. Layers of a radio interface protocol may be implemented by the processor 1421. The memory 1422 is connected with the processor 1421 to store various pieces of information for driving the processor 1421. The RF unit 1423 is connected with the processor 1421 to transmit and/or receive a radio signal.

The memories 1412 and 1422 may be positioned inside or outside the processors 1411 and 1421 and connected with the processors 1411 and 1421 by various well-known means. Further, the eNB 1410 and/or the UE 1420 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations may be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The present invention has been described based on an example in which it is applied to the 3GPP LTE/LTE-A systems or 5G systems, but may be applied to various wireless communication systems in addition to the 3GPP LTE/LTE-A systems or 5G system.

What is claimed is:

1. A method implemented by a user equipment (UE) in a wireless communication system, the method comprising:
receiving configuration information that includes power control information, wherein the power control information includes information related to a sounding reference signal (SRS) resource indicator (SRI);
receiving downlink control information (DCI) for scheduling an uplink shared channel, wherein the DCI includes a field for the SRI; and
transmitting the uplink shared channel with a transmission power,
wherein the transmission power is determined based on the power control information that is mapped to a value of the field.

2. The method of claim 1, wherein the configuration information is received via a higher layer signaling.

3. The method of claim 1, wherein, based on (i) a plurality of SRS resources being indicated by the SRI and (ii) a layer group being configured differently for each of the plurality of SRS resources, a parameter set for power control of the uplink shared channel is respectively determined for each layer group.

4. The method of claim 1, wherein the transmission power is determined, based on a downlink path-loss estimation value calculated by using a downlink reference signal indicated by the power control information.

5. The method of claim 4, wherein the downlink reference signal is changed by a medium access control-control element (MAC-CE).

6. The method of claim 1, wherein the transmission power is further based on a downlink path-loss estimation value calculated by using a downlink reference signal; and
based on the downlink reference signal being not provided by a base station, the downlink path-loss estimation value is calculated using a downlink reference signal having a relatively largest power level.

7. A user equipment (UE) configured to operate in a wireless communication system, the UE comprising:
a transceiver; and
at least one processor coupled to the transceiver and configured to:
receive configuration information that includes power control information, wherein the power control information includes information related to sounding reference signal (SRS) resource indicator (SRI) and a power control identifier;
receive downlink control information (DCI) for scheduling an uplink shared channel, wherein the DCI includes a field for the SRI; and
transmit the uplink shared channel with a transmission power,
wherein the specific transmission power is determined based on the power control information that is mapped to a value of the field.

8. The UE of claim 7, wherein the configuration information is received via a higher layer signaling.

9. The UE of claim 7, wherein, based on (i) a plurality of SRS resources being indicated by the SRI and (ii) a layer group being configured differently for each of the plurality of SRS resources, a parameter set for power control of the uplink shared channel is respectively determined for each layer group.

10. The UE of claim 7, wherein the transmission power is determined, based on a downlink path-loss estimation value calculated by using a downlink reference signal indicated by the power control information.

11. The UE of claim 10, wherein the downlink reference signal is changed by a medium access control-control element (MAC-CE).

12. The UE of claim 7, wherein the transmission power is further based on a downlink path-loss estimation value calculated by using a downlink reference signal; and
based on the downlink reference signal being not provided by a base station, the downlink path-loss estimation value is calculated using a downlink reference signal having a relatively largest power level.

13. A method implemented by a base station in a wireless communication system, the method comprising:
transmitting configuration information that includes power control information, wherein the power control information includes information related to a sounding reference signal (SRS) resource indicator (SRI);
transmitting downlink control information (DCI) for scheduling an uplink shared channel, wherein the DCI includes a field for the SRI; and
receiving the uplink shared channel that is transmitted with a transmission power,
wherein the transmission power is determined based on the power control information that is mapped to a value of the field.

14. The method of claim 13, wherein the configuration information is transmitted via a higher layer signaling.

15. The method of claim 13, wherein, based on (i) a plurality of SRS resources being indicated by the SRI and (ii) a layer group being configured differently for each of the plurality of SRS resources, a parameter set for power control of the uplink shared channel is respectively determined for each layer group.

16. The method of claim 13, wherein the transmission power is determined, based on a downlink path-loss estimation value calculated by using a downlink reference signal indicated by the power control information.

17. The method of claim 16, wherein the downlink reference signal is changed by a medium access control-control element (MAC-CE).

18. The method of claim 13, wherein the transmission power is further based on a downlink path-loss estimation value calculated by using a downlink reference signal; and
based on the downlink reference signal being not provided by the base station, the downlink path-loss estimation value is calculated using a downlink reference signal having a relatively largest power level.

* * * * *